United States Patent
Montanez et al.

(10) Patent No.: US 11,747,042 B2
(45) Date of Patent: Sep. 5, 2023

(54) SYSTEMS AND METHODS FOR MANAGING TEMPERATURE CONTROL OF BODIES OF WATER

(71) Applicant: Rheem Manufacturing Company, Atlanta, GA (US)

(72) Inventors: Juan Carlos Montanez, Oxnard, CA (US); Jorge Miguel Gamboa, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 925 days.

(21) Appl. No.: 16/725,871

(22) Filed: Dec. 23, 2019

(65) Prior Publication Data

US 2021/0190372 A1 Jun. 24, 2021

(51) Int. Cl.
*F24H 1/10* (2022.01)
*F24H 9/20* (2022.01)
(Continued)

(52) U.S. Cl.
CPC ......... *F24H 1/105* (2013.01); *G05D 23/1931* (2013.01); *E04H 4/1209* (2013.01); *F24H 9/2028* (2013.01); *G01K 7/02* (2013.01)

(58) Field of Classification Search
None
See application file for complete search history.

(56) References Cited

U.S. PATENT DOCUMENTS 3,958,555 A * 5/1976 Horne .................. E03C 1/041
122/13.3
3,999,709 A * 12/1976 Estabrook .............. F24D 3/08
237/19
(Continued)

FOREIGN PATENT DOCUMENTS

| RU | 2272224 C2 | 3/2006 |
| RU | 2514572 C1 | 4/2014 |
| RU | 184497 U1 | 10/2018 |

OTHER PUBLICATIONS

International Search Report and Written Opinion for PCT Application No. PCT/US2020/066542 dated Apr. 22, 2021.

*Primary Examiner* — Thor S Campbell
(74) *Attorney, Agent, or Firm* — Eversheds Sutherland (US) LLP

(57) ABSTRACT

A heating system of a managed fluid system can include a heat exchanger and a first temperature sensor device that measures an inlet temperature of a fluid flowing into the heat exchanger. The heating system can also include a second temperature sensor device that measures an outlet temperature of the fluid flowing out of the heat exchanger. The heating system can further include a controller communicably coupled to the first temperature sensor device and the second temperature sensor device. The controller can receive inlet temperature measurements made by the first temperature sensor device and outlet temperature measurements made by the second temperature sensor device. The controller can also evaluate the inlet temperature measurements and the outlet temperature measurements using at least one lookup table and at least one algorithm. The controller can subsequently determine an input rate of fuel used to heat the fluid flowing through the heat exchanger.

20 Claims, 13 Drawing Sheets

(51) Int. Cl.
*G05D 23/19* (2006.01)
*E04H 4/12* (2006.01)
*G01K 7/02* (2021.01)

(56) References Cited

U.S. PATENT DOCUMENTS

| | | | | |
|---|---|---|---|---|
| 4,680,446 | A * | 7/1987 | Post | F24D 17/0089 |
| | | | | 122/13.3 |
| 6,906,289 | B2 * | 6/2005 | Serres Vives | A47J 36/2483 |
| | | | | 219/386 |
| 8,107,803 | B1 * | 1/2012 | Hannah | A47J 31/4403 |
| | | | | 392/494 |
| 8,669,494 | B2 * | 3/2014 | Tran | H05B 1/0269 |
| | | | | 219/492 |
| 10,288,317 | B2 | 5/2019 | Cool | |
| 10,365,013 | B1 * | 7/2019 | Wieckowski | F24H 9/1818 |
| 2003/0233173 | A1 * | 12/2003 | Stewart | G05D 23/1931 |
| | | | | 700/299 |
| 2010/0290763 | A1 * | 11/2010 | Boulay | F24H 1/201 |
| | | | | 219/494 |
| 2012/0057857 | A1 * | 3/2012 | Kenney | F24H 9/2028 |
| | | | | 219/494 |
| 2019/0271487 | A1 * | 9/2019 | Callahan | F24H 9/1818 |
| 2021/0095892 | A1 * | 4/2021 | Buescher | G05B 15/02 |

\* cited by examiner

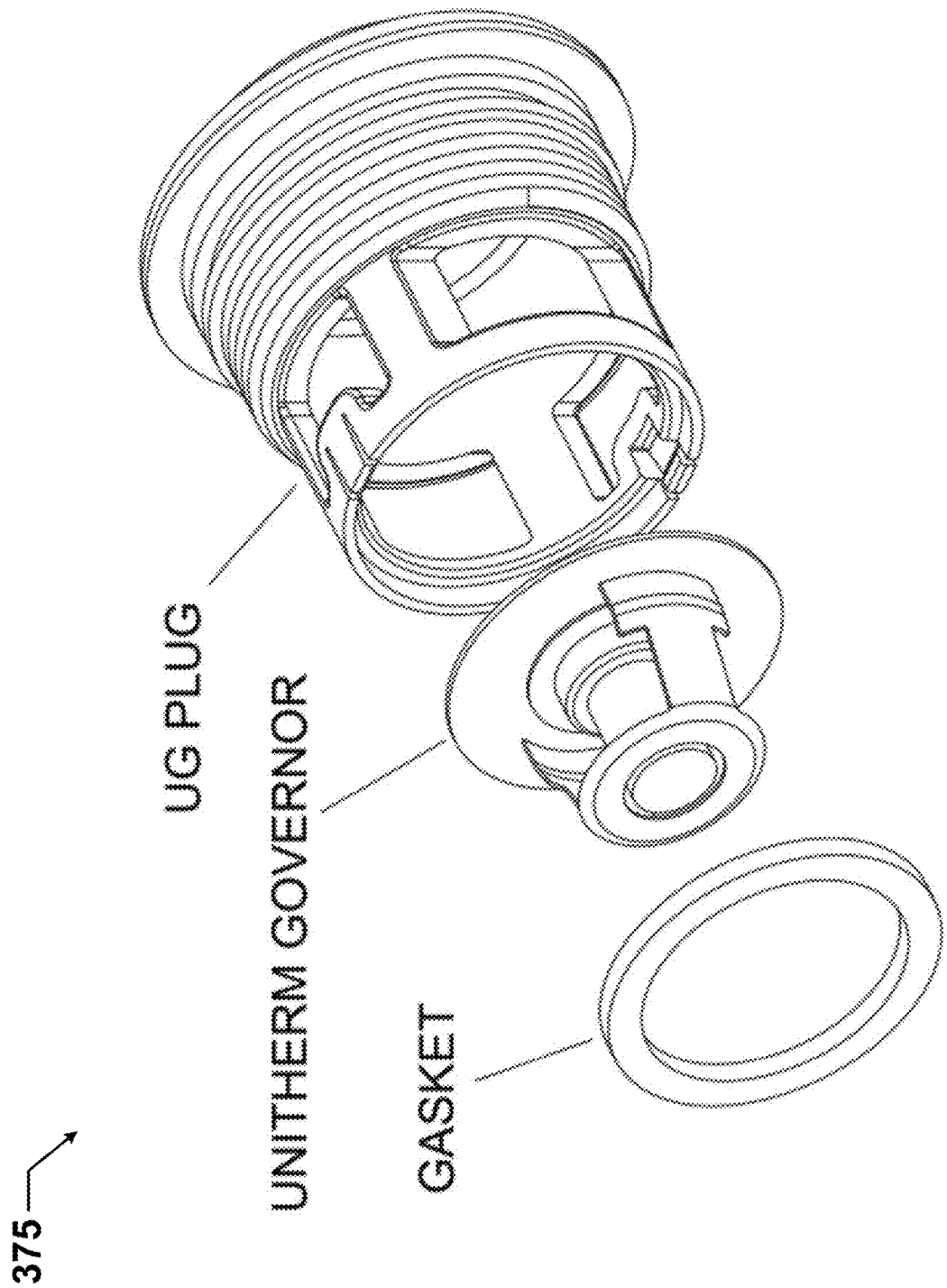

SYSTEMS AND METHODS FOR MANAGING TEMPERATURE CONTROL OF BODIES OF WATER

TECHNICAL FIELD

The present disclosure relates generally to managing bodies of water, and more particularly to systems, methods, and devices for providing information about and management of temperature control of bodies of water (e.g., swimming pools, spas, fountains).

BACKGROUND

The heat up duration of a spa, swimming pool, or other controlled body of water varies, depending on a number of factors (e.g., heating capacity, the volume/mass of water). This process of heating such a body of water can be quite long and expensive. Also, oftentimes when heating such a body of water is occurring, little to no effort is made to optimize the use of the equipment involved in the process.

SUMMARY

In general, in one aspect, the disclosure relates to a heating system of a managed fluid system. The heating system can include a heat exchanger and a first temperature sensor device that is configured to measure an inlet temperature of a fluid flowing into the heat exchanger. The heating system can also include a second temperature sensor device that is configured to measure an outlet temperature of the fluid flowing out of the heat exchanger. The heating system can further include a controller communicably coupled to the first temperature sensor device and the second temperature sensor device. The controller can be configured to receive a plurality of inlet temperature measurements made by the first temperature sensor device. The controller can also be configured to receive a plurality of outlet temperature measurements made by the second temperature sensor device. The controller can further be configured to evaluate the plurality of inlet temperature measurements and the plurality of outlet temperature measurements using at least one lookup table and at least one algorithm. The controller can also be configured to determine, based on evaluating the plurality of inlet temperature measurements and the plurality of outlet temperature measurements, an input rate of fuel used to heat the fluid flowing through the heat exchanger.

In another aspect, the disclosure can generally relate to a controller for a heating system of a managed fluid system, where the controller includes a control engine. The control engine can be configured to receive a plurality of inlet temperature measurements made by a first temperature sensor device, where the first temperature sensor device is configured to measure the plurality of inlet temperatures of a fluid flowing into a heat exchanger of the heating system. The control engine can also be configured to receive a plurality of outlet temperature measurements made by a second temperature sensor device, where the second temperature sensor device is configured to measure the plurality of outlet temperatures of the fluid flowing out of the heat exchanger of the heating system. The control engine can further be configured to evaluate the plurality of inlet temperature measurements and the plurality of outlet temperature measurements using at least one lookup table and at least one algorithm. The control engine can also be configured to determine, based on evaluating the plurality of inlet temperature measurements and the plurality of outlet temperature measurements, an input rate of fuel used to heat the fluid flowing through the heat exchanger.

In yet another aspect, the disclosure can generally relate to a non-transitory computer-readable medium comprising instructions that, when executed by a hardware processor, perform a method for managing a heating system of a managed fluid system. The method can include receiving a plurality of inlet temperature measurements made by a first temperature sensor device, where the first temperature sensor device is configured to measure the plurality of inlet temperatures of a fluid flowing into a heat exchanger of the heating system. The method can also include receiving a plurality of outlet temperature measurements made by a second temperature sensor device, where the second temperature sensor device is configured to measure the plurality of outlet temperatures of the fluid flowing out of the heat exchanger of the heating system. The method can further include evaluating the plurality of inlet temperature measurements and the plurality of outlet temperature measurements using at least one lookup table and at least one algorithm. The method can also include determining, based on evaluating the plurality of inlet temperature measurements and the plurality of outlet temperature measurements, an input rate of fuel used to heat the fluid flowing through the heat exchanger.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 3A through 3D show various views of a heating system in accordance with certain example embodiments.

DETAILED DESCRIPTION

Figure 1A:
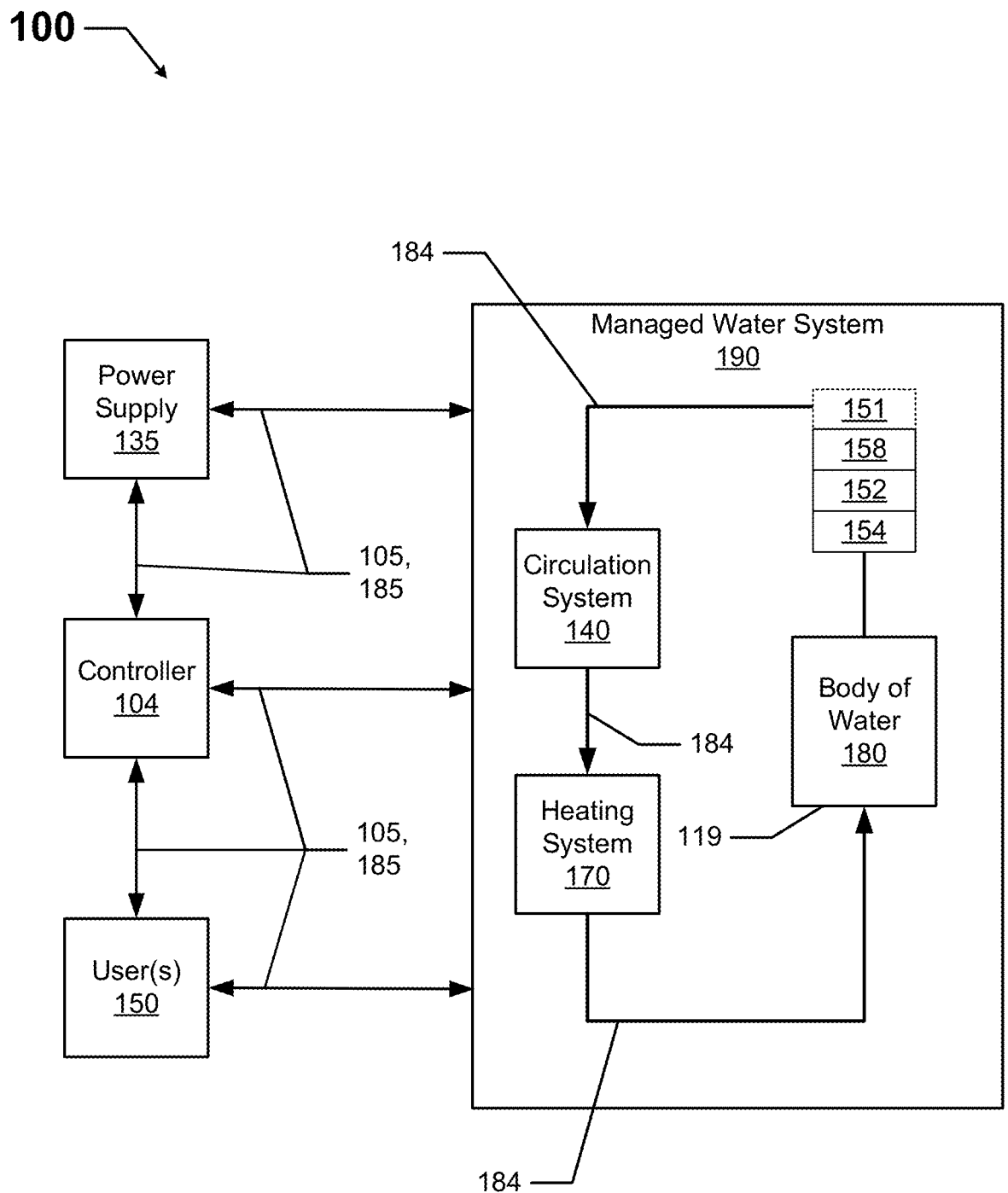
FIGS. 1A and 1B show diagrams of a system that includes a swimming pool and a controller in accordance with certain example embodiments.

In general, example embodiments provide systems, methods, and devices for determining information about and enabling the management of temperature control of a swimming pool, a spa, and/or some other controlled body of water. Example embodiments can be used for any size (e.g., capacity) of a controlled body of water. Further, example embodiments can be used with a controlled body of water for any application (e.g., commercial, residential, industrial). A controlled body of water can be used for any of a number of purposes, including but not limited to recreation, sustaining life, and commercial production. In addition, example embodiments can be used with any type of heating system, including but not limited to electric heaters, gas heaters, geothermal heaters, and heat pump heaters.

A controlled body of can refer to the application of heat, circulation, and/or some other process (e.g., chemical treatment) to a body of water. Example embodiments are used specifically for controlling the temperature of a controlled body of water. In some cases, particularly for commercial and industrial applications, example embodiments can be used for a liquid aside from water. In other words, example embodiments can be used to manage the temperature of non-water liquids.

Example embodiments can make a number of determinations with respect to controlling a temperature of a controlled body of water. For instance, example embodiments can determine how long it will take to heat a controlled body of water to a target temperature. As another example, example embodiments can determine the rate of fuel (e.g., natural gas) that flows to a heater in order to heat a controlled body of water at a particular rate. As yet another example, example embodiments can determine the cost of heating a controlled body of water. As still another example, example embodiments can provide advice as to whether the existing equipment (e.g., heater) is sufficient for servicing a controlled body of water.

Example embodiments can also take one or more actions to implement a recommendation based on conclusions reached by an example system. For instance, example embodiments can control one or more valves to control the flow of a fuel to the burner of a heaters to bring the water temperature of a controlled body of water to a particular temperature by a particular point in time in the most cost-effective manner.

Systems (or components thereof, including controllers) for temperature control for controlled bodies of water described herein can be made of one or more of a number of suitable materials to allow that system and/or other associated components of the system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a system (or portions thereof) for controlling the temperature of controlled bodies of water described herein can be made from a single piece (as from a mold, injection mold, die cast, or extrusion process). In addition, or in the alternative, components of a system (or portions thereof) for controlling the temperature of controlled bodies of water can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of systems and methods for controlling the temperature of controlled bodies of water, one or more of the components shown may be omitted, repeated, and/or substituted. Accordingly, example embodiments of systems and methods for controlling the temperature of controlled bodies of water should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three-digit number, and corresponding components in other figures have the identical last two digits.

In some cases, example embodiments can be subject to meeting certain standards and/or requirements. Examples of entities that set and/or maintain such standards and/or requirements include, but are not limited to, the Pool and Hot Tub Alliance (PHTA), the Association of Pool and Spa Professionals (APSP), the Department of Energy (DOE), the National Electric Code (NEC), the National Electrical Manufacturers Association (NEMA), the International Electrotechnical Commission (IEC), the American Society of Mechanical Engineers (ASME), the American National Standards Institute (ANSI), the American Society of Heating, Refrigeration and Air Conditioning Engineers (ASHRAE), Underwriters' Laboratories (UL), the American Society of Testing and Materials (ASTM), and the Institute of Electrical and Electronics Engineers (IEEE). Use of example embodiments described herein meet (and/or allow a corresponding system or portion thereof to meet) such standards when required.

Example embodiments of systems and methods for controlling the temperature of controlled bodies of water will be described more fully hereinafter with reference to the accompanying drawings, in which example embodiments of systems and methods for controlling the temperature of controlled bodies of water are shown. Systems and methods for controlling the temperature of controlled bodies of water may, however, be embodied in many different forms and should not be construed as limited to the example embodiments set forth herein. Rather, these example embodiments are provided so that this disclosure will be thorough and complete, and will fully convey the scope of systems and methods for controlling the temperature of controlled bodies of water to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation. Such terms are not meant to limit embodiments of systems and methods for controlling the temperature of controlled bodies of water. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
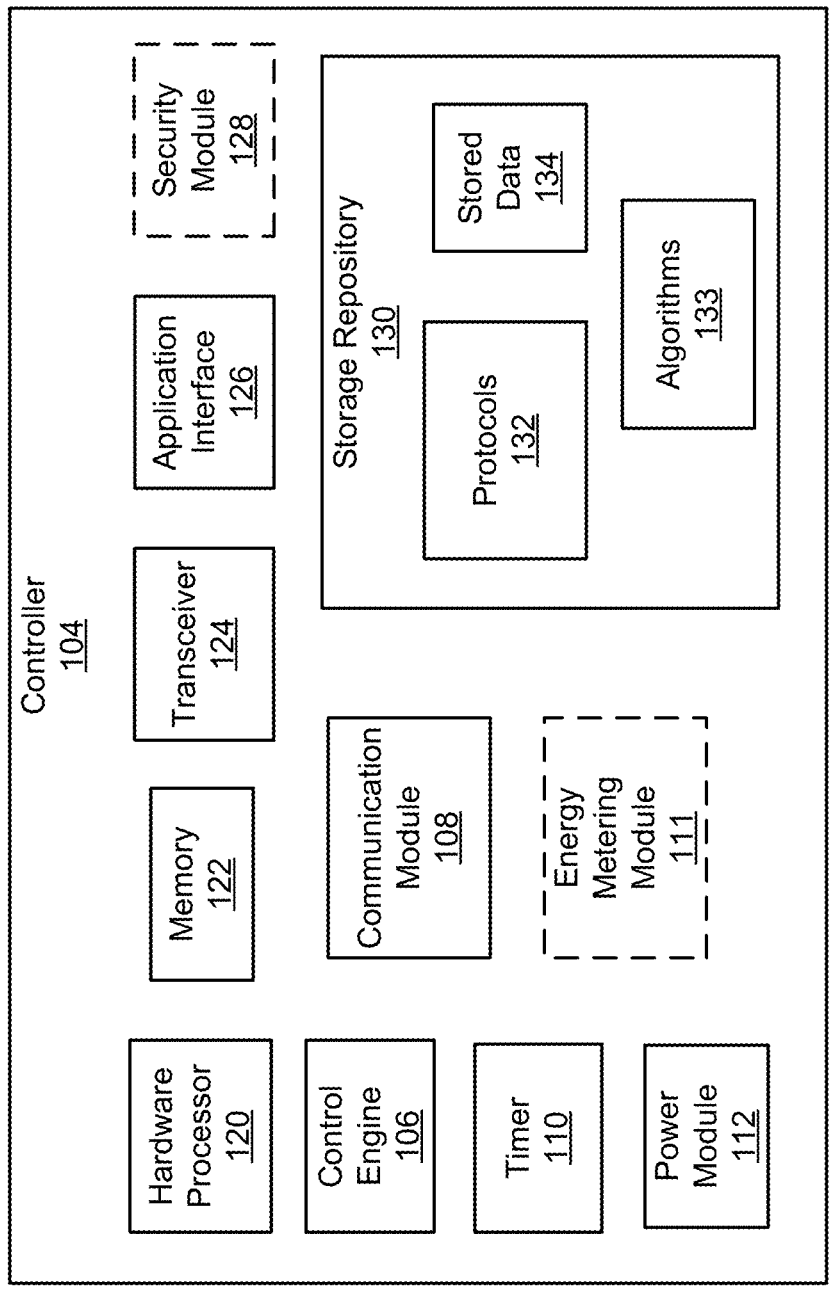

FIGS. 1A and 1B show diagrams of a system 100 that includes a managed water system 190 that is controlled (or at least monitored) by a controller 104 in accordance with certain example embodiments. Specifically, FIG. 1A shows the overall system 100 that includes the managed water system 190, and FIG. 1B shows a detailed system diagram of the controller 104. As shown in FIGS. 1A and 1B, the system 100 can include the managed water system 190, the controller 104, a power supply 135, and one or more users 150. The managed water system 190 includes a one or more bodies of water 180, a circulation system 140, and a heating system 170 that are connected to each other in a loop by a piping system 184. The heating system 170 can generally be referred to as an ancillary system. Within the piping system 184 can be one or more sensors 151 (e.g., temperature sensors 158, flow sensors 154) and one or more valves 152.

As shown in FIG. 1B, the controller 104 can include one or more of a number of components. Such components, can include, but are not limited to, a control engine 106, a communication module 108, a timer 110, an optional energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, the controller 104 can be part of the heating system 170 of the managed water system 190. Any component of the system 100 can be discrete or combined with one or more other components of the system 100.

A user 150 may be any person or entity that interacts with the managed water system 190 (or portions thereof) and/or the controller 104. Examples of a user 150 may include, but are not limited to, an engineer, an appliance or process that uses heated water, an electrician, an instrumentation and controls technician, a mechanic, an operator, a consultant, a pool maintenance operator, a pool/spa designer, a park management employee, an electric utility, a grid operator, a retail electric provider, an energy marketing company, load forecasting software, a weather forecasting service, a labor scheduling system, a contractor, a homeowner, a landlord, a government entity (e.g., a municipal parks and recreation department), a hotel manager, a building management company, and a manufacturer's representative. There can be one or multiple users 150 at any given time.

The user 150 can use and/or include a user system (also sometimes called a user device, not shown, but such as a smart phone or a laptop computer), which may include a display (e.g., a GUI). A user 150 can interact with (e.g., send data to, receive data from) the controller 104 via the application interface 126 (described below). A user 150 can also interact with the managed water system 190 (including any components thereof, such as one or more of the sensor devices 151, the circulation system 140, and the heating system 170) and/or the power supply 135. Interaction between a user 150, the controller 104, the managed water system 190, and the power supply 135 can be conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, Bluetooth Low Energy (BLE), WirelessHART, ISA100) technology. For example, a signal transfer link 105 can be (or include) one or more electrical conductors that are coupled to the controller 104 and to a sensor device 151 of the managed water system 190. A signal transfer link 105 can transmit signals (e.g., communication signals, control signals, data) between the controller 104, a user 150 (including an associated user device), the managed water system 190 (including components thereof), and/or the power supply 135.

Similarly, a power transfer link 185 can transmit power between the controller 104, a user 150 (including an associated user device), the managed water system 190 (including components thereof), and/or the power supply 135. One or more signal transfer links 105 and/or one or more power transfer links 185 can also transmit signals and power, respectively, between components (e.g., temperature sensor 158, flow sensor 154, heating system 170) within the managed water system 190 and/or within the controller 104.

The power supply 135 provides power, directly or indirectly, to one or more components (e.g., the sensor devices 151, the controller 104, the heating system 170, a user system of a user 150) of the system 100. The power supply 135 can include one or more components (e.g., a transformer, a fuse) that receives power (for example, through an electrical cable) from an independent power source external to the heating system 100 and generates power of a type (e.g., AC, DC) and level (e.g., 240V, 120V) that can be used by one or more components of the system 100. For example, the power supply 135 can provide 240 VAC power to the heating system 170 of the managed water system 190. In addition, or in the alternative, the power supply 135 can be or include a source of power in itself. For example, the power supply 135 can be or include a battery, a localized photovoltaic power system, or some other source of independent power.

The managed water system 190 is a system having one or more components that manage, in at least one way, a body of water 180 that is at least partially contained in a vessel 119. Ways in which the body of water 180 can be managed can include, but are not limited to, circulating the body of water 180, measuring a parameter (e.g., temperature, flow rate) of the body of water 180, and heating the body of water 180. The managed water system 190 includes multiple components. For example, as stated above, the managed water system 190 of the system 100 of FIG. 1A includes one or more sensor devices 151 (e.g., temperature sensors 158, flow sensors 154), one or more valves 152, one or more bodies of water 180, a vessel 119, a piping system 184, a circulation system 140, and the heating system 170. The managed water system 190 (including portions thereof) can be indoors, outdoors, or some combination thereof. Similarly, the managed water system 190 (including portions thereof) can be visible (e.g., above ground), hidden (e.g., buried underground), or some combination thereof. As discussed above, the managed water system 190 can include one or more bodies of water 180. (When there are multiple bodies of water 180 or multiple parts of a body of water 180, the collective group can be called a single body of water 180 herein.)

A body of water 180 has a vessel 119 that is used to hold most, if not all, of the water. The vessel 119 of each body of water 180 can have any of a number of characteristics (e.g., shape, depth, width, curvature). The vessel 119 can be located in-ground and/or above ground. The vessel 119 can be open-ended at the top or substantially covered to enclose the water therein. The vessel 119 can be made of one or more of a number of materials, including but not limited to cement, plaster, steel, fiberglass, stone, brick, clay, rubber, glass, and plastic. Examples of a vessel 119 can include, but are not limited to, a swimming pool, a spa, a fountain, a retention pond, a water treatment tank, a fish tank, an aquarium, a water reuse tank, a fish stocking pond, and a water storage tank.

If there are multiple bodies of water 180 in the managed water system 190, the bodies of water 180 can be isolated from each other. In addition, or in the alternative, one body of water 180 in the managed water system 190 can somehow be tied to at least one other body of water 180 in the managed water system 190. For example, one body of water 180 of a managed water system 190 can be a swimming pool, while another body of water 180 of the managed water system 190 can be an elevated spa whose excess water can flow into the swimming pool.

The circulation system 140 includes one or more of a number of components that are used to send water to and remove water from the one or more vessels 119 holding the bodies of water 180. Examples of such components can include, but are not limited to, a motor (e.g., variable speed, constant speed), a pump, a check valve, and a filter basket. The circulation system 140 works in conjunction with the piping system 184, which includes a number of pipe segments that are connected with each other to form a path for water to flow therethrough. A pipe segment of the piping system 184 can be a linear tube segment, a curved tube segment, an elbow, a junction (e.g., T-junction, Y-junction), or any other suitable component that can be used to facilitate the flow of water therethrough.

The heating system 170 includes one or more components that are used to heat water that flows through the piping system 184 using the circulation system 140. For example, the heating system 170 can include one or more heaters, where such heaters can be a gas-fired heater, an electric heater, a heat pump, a geothermal heater, and a solar thermal heater. The heater of a heating system 170 in some cases can include a burner, a heat exchanger, and a controller (e.g., controller 104), where the controller controls, for example, a valve to regulate the amount of fuel (e.g., natural gas) that feeds a burner, which in turns outputs heat used to raise the temperature of water flowing through the heating system 170. An example of a heating system 170 is included below with respect to FIGS. 3A through 3C.

As discussed above, the managed water system 190 can include one or more valves 152 and one or more sensor devices 151 (e.g., temperature sensors 158, flow sensors 154). Each of the sensor devices 151 (also sometimes referred to herein as sensors 151) can measure one or more of a number of parameters. Examples of types of sensors 151 can include, but are not limited to, temperature sensor, a pressure sensor, a flow rate sensor, a scale, a voltmeter, an ammeter, a power meter, an ohmmeter, and an electric power meter. A sensor 151 can also include one or more components and/or devices (e.g., a potential transformer, a current transformer, electrical wiring) related to the measurement of a parameter.

A parameter that can be measured by a sensor 151 can include, but is not limited to, pressure, flow rate, current, voltage, power, resistance, weight, volume, and temperature. In certain example embodiments, the parameter or parameters measured by a sensor 151 can be used by the controller 104 to control the temperature of a heater of the heating system 170. Each sensor 151 can use one or more of a number of communication protocols. A sensor 151 can be a stand-alone device or integrated with another component (e.g., a valve 152, the heating system 170) in the system 100. A sensor 151 can measure a parameter continuously, periodically, based on the occurrence of an event, based on a command received from the control engine 106 of the controller 104, and/or based on some other factor.

Each valve 152 of the managed water system 190 can be any type of valve. Examples of types of valves can include, but are not limited to, a gate valve, a ball valve, a butterfly valve, and a diaphragm valve. A valve can be controlled manually (e.g., adjusted by a user 150) or automatically (e.g., by the controller 104). A valve can have a number of discrete positions or a range of continuous positions. A valve can any range (e.g., 90°, 180°) of operation. A valve 152 can be used to control the flow of any of a number of fluids (e.g., water, natural gas, propane). A valve 152 can be integrated with the piping system 184.

Each of the various valves 152 and sensor devices 151 can be located at any point in the managed water system 190. For example, one or more valves 152 can be disposed between the circulation system 140 and the heating system 170 to control the flow of water in the piping system 184 through the heating system 170. Similarly, one or more valves 152 can be disposed before or within the vessel 119 to control the flow of water in the piping system 184 through the vessel 119. In some cases, this can include bypassing a part (e.g., a swimming pool in favor of a spa) of the body of water 180 altogether. Alternatively, one or more valves 152 can be disposed within the heating system 170 to control the flow of a fuel (e.g., natural gas, propane) that burns at the burner of the heating system 170 to generate the heat used to raise the temperature of the body of water 180.

The heating system 170 of the water heater 190 can include one or more devices (or components thereof) that consume energy (e.g., electricity, natural gas, propane) during operation. An example of such a device or component of the heating system 170 can include, but are not limited to, heating elements, a burner, a heat exchanger, an inducer, and a blower. Those of ordinary skill in the art will appreciate that the heating system 170 can have any of a number of configurations. In any case, the controller 104 can be aware of the devices, components, ratings, positioning, and any other relevant information regarding the heating system 170.

In some cases, one or more devices of the heating system 170 can have its own local controller. In such a case, the controller 104 can communicate with the local controller of the heating system 170 using signal transfer links 105 and/or power transfer links 185. In any case, a controller (e.g., controller 104) can be used to control the temperature that the heating system 170 (including its various components such as a heater) can output to heat the body of water 180 flowing through the heating system 170.

A user 150 (including an associated user device), the power supply 135, and/or the managed water system 190 (including portions thereof, such as sensors 151) can interact with the controller 104 using the application interface 126 in accordance with one or more example embodiments. Specifically, the application interface 126 of the controller 104 receives data (e.g., information, communications, instructions, updates to firmware) from and sends data (e.g., information, communications, instructions) to a user 150 (including an associated user device), the power supply 135, and/or the managed water system 190. The users 150 (including associated user devices), the power supply 135, and the managed water system 190 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the controller 104 can include a user interface having one or more of a number of I/O devices 216 (e.g., buzzer, alarm, indicating light, pushbutton).

The controller 104, a user 150, the power supply 135, and/or the managed water system 190 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The controller 104 can be a stand-alone device or integrated with another component (e.g., the managed water system 190) in the system 100. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on such a housing and/or remotely from such a housing.

The storage repository 130 can be a persistent storage device (or set of devices) that stores software and data used to assist the controller 104 in communicating with a user 150 (including an associated user device), the power supply 135, and managed water system 190 (including components thereof) within the system 100. In one or more example embodiments, the storage repository 130 stores one or more protocols 132, one or more algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols 132 that are used to send and/or receive data between the controller 104 and a user 150, the power supply 135, and the managed water system 190.

A protocol 132 can be used for wired and/or wireless communication. Examples of a protocol 132 can include, but are not limited to, Econet, Modbus, profibus, Ethernet, and fiberoptic. One or more of the communication protocols 132 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 132 can provide a layer of security to the data transferred within the system 100.

The algorithms 133 can be any formulas, mathematical models, and/or other suitable means of manipulating and/or processing data. One or more algorithms 133 can be used in conjunction with one or more particular protocols 132. As discussed above, the controller 104 uses information (e.g., temperature measurements) provided by the sensor devices 151 (e.g., one or more temperature sensors 158, one or more flow sensors 154) to generate, using one or more protocols 132 and/or one or more algorithms 133, information related to controlling the temperature or amount of heat applied by the heating system 170 to the body of water 180.

For example, one or more protocols 132 and/or one or more algorithms 133 can dictate when a measurement is taken by a sensor device 151 and which particular sensor devices 151 take a measurement at that point in time. As another example, a protocol 132 and/or an algorithm 133 can be used, in conjunction with measurements made by one or more sensor devices 151, by the controller 104 to determine an actual amount of heat generated by a heater of the heating system 170, which in turn can allow the controller 104 to determine how effectively the heat is being applied to heat one or more of the bodies of water 180. This determination can be performed by the controller 104 on demand (in response to a one-time request from a user 150).

Alternatively, this determination can be performed proactively by using one or more protocols 132 and/or one or more algorithms 133. For example, if a user 150 requests that the temperature of the body of water 180 be at 85° F. (a target temperature) by 2:00 that afternoon, the controller 104 can determine when and how to operate the heating system 170 (e.g., adjust the flow of fuel to the burner of the heating system 170) in order to have the temperature of the body of water 180 reach 85° F. by 2:00 that afternoon. The determination in this case can be based on one or more of a number of factors, including but not limited to the temperature of the water flowing into the heater of the heating system 170, the temperature of the water flowing out of the heater of the heating system 170, the flow rate of the fuel feeding the burner of the heating system 170, the ambient temperature where the body of water 180 is located, the forecast of the ambient temperature over time leading up to 2:00 that afternoon, and a target energy (e.g., fuel) cost to get the water to the target temperature. The one or more protocols 132 and/or one or more algorithms 133 can account for these factors.

As yet another example, one or more protocols 132 and/or one or more algorithms 133 can be used to determine how much it will cost (e.g., for electricity, for natural gas, in total) to operate the heating system 170 (or components thereof) to get the temperature of the water in one or more of the bodies of water 180 to a particular target temperature. One or more protocols 132 and/or one or more algorithms 133 can also be used to improve maintenance and performance of the managed water system 190. For example, one or more protocols 132 and/or one or more algorithms 133 can be used to operate the heating system 170 in such a way that has minimal impact on the equipment of the heating system 170. As another example, one or more protocols 132 and/or one or more algorithms 133 can be used to operate the heating system 170 in such a way as to result in the least cost to achieve the target temperature of the body of water 180.

One or more protocols 132 and/or one or more algorithms 133 can be used to determine if a component (e.g., a temperature sensor 158 of the heating system 170, a valve 152 controlling the flow of fuel for the heating system 170) of the managed water system 190 is failing or has failed. In some cases, one or more protocols 132 and/or one or more algorithms 133 can be used to perform an assessment of the existing equipment of the heating system 170 to determine if improvements can be made. For example, one or more protocols 132 and/or one or more algorithms 133 can be used to suggest, assess, and quantify savings (e.g., in electricity, in fuel) that can be realized by replacing a standard heater with a low NOx heater. As another example, one or more protocols 132 and/or one or more algorithms 133 can be used to suggest, assess, and quantify some other alteration (e.g., add a heater) to the heating system 170.

One or more protocols 132 and/or one or more algorithms 133 can be used to establish and maintain one or more lookup tables that are stored in the storage repository 130 as stored data 134. A lookup table is a table that the control engine 106 of the controller 104, following one or more protocols 132 and/or one or more algorithms 133, and based on one or more measurements made by one or more sensor devices 151 (e.g., temperature sensors 158), uses to determine how one or more components (e.g., a valve 152) of the heating system 170 should be controlled. Examples of lookup tables are shown below.

In certain example embodiments, one or more protocols 132 and/or one or more algorithms 133 can be modified. Such modifications can be based on, for example, actual data, input from a user 150 (including an associated user system), information received by the controller 104 regarding other similar managed water systems, addition of equipment (e.g., motors, sensor devices 151, heaters for the heating system 170, burner for a heater of the heating system 170), modification to existing equipment of the managed water system 190, reconfiguration of the piping system 184, and/or data from other similarly-configured managed water systems 190 (including portions thereof, such as heating system 170). Such modifications to the protocols 132 and/or the algorithms 133 can be made in real time (e.g., by the controller 104).

Stored data 134 can be any data associated with the system 100 (including any components thereof), any measurements taken by the sensor devices 151, time measured by the timer 110, adjustments to an algorithm 133, threshold values, set point values, user preferences, default values, lookup tables, results of previously run or calculated algorithms 133, and/or any other suitable data. Such data can be any type of data, including but not limited to historical data for the system 100 (including any components thereof, such as the sensor devices 151 and the heating system 170), present data (e.g., calculations, adjustments made to calculations based on actual data, measurements taken by one or more sensor devices 151), and forecasts. The stored data 134 can be associated with some measurement of time derived, for example, from the timer 110.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location. Some or all of the storage repository 130 can use a cloud-based platform and/or technology.

The storage repository 130 can be operatively connected to the control engine 106 of the controller 104. In one or more example embodiments, the control engine 106 includes functionality to communicate with the users 150 (including associated user systems), the power supply 135, and the managed water system 190 (including components thereof) in the system 100. More specifically, the control engine 106 sends information to and/or receives information from the storage repository 130 in order to communicate with the users 150 (including associated user systems), the power supply 135, and the managed water system 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor device 151, a user 150) in the system 100.

As another example, the control engine 106 can acquire the current time using the timer 110. The timer 110 can enable the controller 104 to control the heating system 170 (including any components thereof). As yet another example, the control engine 106 can direct a sensor device 151 (e.g., temperature sensor 158) to measure a parameter (e.g., temperature) and send the measurement by reply to the control engine 106.

The control engine 106 can be configured to perform a number of functions that control the amount of heat generated by the heating system 170 that is applied to the water in one or more bodies of water 180 of the managed water system 190 as the water flows through the heating system 170. For example, the control engine 106 can execute any of the protocols 132 and/or algorithms 133 stored in the storage repository 130 and use the results of those protocols 132 and/or algorithms 133 to change the position of a valve 152 that controls the amount of fuel (e.g., natural gas, propane) that flows to a burner of the heating system 170. This determination can be performed by the control engine 106 while the body of water 180 is being heated by the heating system 170 or in anticipation of beginning the process of heating the body of water 180 by the heating system 170.

Alternatively, this determination can be performed proactively by the control engine 106 of the controller 104. For example, if a user 150 requests that the temperature of the water of the body of water 180 be at 85° F. (a target temperature) by 6:00 that evening, the controller 104 can determine when and how to operate the heating system 170 (e.g., adjust the flow of fuel to the burner of the heating system 170) in order to have the temperature of the body of water 180 reach 85° F. by 6:00 that evening. The determination in this case can be based on one or more of a number of factors, including but not limited to the temperature of the water flowing into the heater of the heating system 170, the temperature of the water flowing out of the heater of the heating system 170, the flow rate of the fuel feeding the burner of the heating system 170, the ambient temperature where the body of water 180 is located, the forecast of the ambient temperature over time leading up to 6:00 that evening, and a target energy (e.g., natural gas, electricity) cost to get the water to the target temperature.

In certain example embodiments, the control engine 106 of the controller 104 can use one or more protocols 132 and/or one or more algorithms 133 to determine how much it will cost (e.g., for electricity, for natural gas, in total) to operate the heating system 170 (or components thereof) to get the temperature of the water in one or more of the bodies of water 180 to a particular target temperature. The control engine 106 of the controller 104 can also be used to improve maintenance and performance of the managed water system 190. For example, the control engine 106 of the controller 104 can use a protocol 132 and/or an algorithm 133 to operate the heating system 170 in such a way that has minimal impact on the equipment of the heating system 170. As another example, one or more protocols 132 and/or one or more algorithms 133 can be used to operate the heating system 170 in such a way as to result in the least cost to achieve the target temperature of the body of water 180.

The control engine 106 of the controller 104 can further use a protocol 132 and/or an algorithm 133 to determine if a component (e.g., a temperature sensor 158 of the heating system 170, a valve 152 controlling the flow of fuel for the heating system 170) of the managed water system 190 is failing or has failed. In some cases, one or more protocols 132 and/or one or more algorithms 133 can be used to perform an assessment of the existing equipment of the heating system 170) to determine if improvements can be made. For example, the control engine 106 of the controller 104 can suggest, assess, and quantify savings (e.g., in electricity, in fuel) that can be realized by replacing a standard heater with a low NOx heater. As another example, the control engine 106 of the controller 104 can suggest, assess, and quantify some other alteration (e.g., add a heater) to the heating system 170.

The control engine 106 of the controller 104 can also use one or more protocols 132 and/or one or more algorithms 133 to establish and maintain one or more lookup tables that are stored in the storage repository 130 as stored data 134. A lookup table is a table that the control engine 106 of the controller 104, following one or more protocols 132 and/or one or more algorithms 133, and based on one or more measurements made by one or more sensor devices 151 (e.g., temperature sensors 158), uses to determine how one or more components (e.g., a valve 152) of the heating system 170 should be controlled.

In certain example embodiments, the control engine 106 of the controller 104 can make modifications to one or more of these protocols 132 and/or algorithms 133. Such modifications can be based on, for example, actual data, input from a user 150, information received by the control engine 106 of the controller 104 regarding other similar managed water systems, addition of equipment (e.g., motors, sensor devices 151, heaters) and/or modification to existing equipment of the managed water system 190, reconfiguration of the piping system 184, and data from other similarly-configured managed water systems 190. Such modifications to the protocols 132 and/or the algorithms 133 can be made in real time by the control engine 106 of the controller 104.

The control engine 106 of the controller 104 can generate an alarm or some other form of communication when an operating parameter (e.g., temperature of a body of water 180, speed of a pump motor in the circulation system 140) exceeds or falls below a threshold value (e.g., a set point value) (in other words, falls outside an acceptable range of values). The control engine 106 can also track measurements made by a sensor device 151 (e.g., temperature sensor 158) and determine a possible present or future failure of the sensor device 151 or some other component (e.g., a motor, a heating element) of the managed water system 190 (or portion thereof).

Using one or more algorithms 133, the control engine 106 can predict the expected useful life of these components based on stored data 134, a protocol 132, one or more threshold values, and/or some other factor. The control engine 106 can also determine (e.g., using one or more sensors 151) and analyze the efficiency of the managed water system 190 over time. An alarm can be generated by the control engine 106 when the efficiency of a component of the system 100 falls below a threshold value, indicating failure of that component. In heating a body of water 180 to a desired temperature, the control engine 106 can control the heat output by the heating system 170, which can include controlling one or more components (e.g., a valve 152) to get the water heated more efficiently, more expeditiously, more precisely, in a least-cost manner, and/or based on some other criteria.

The control engine 106 can perform its evaluation functions and resulting actions on a continuous basis, periodically, during certain time intervals, or randomly. Further, the control engine 106 can perform this evaluation for the present time or for a period of time in the future. For example, the control engine 106 can perform forecasts to determine the temperature of a body of water 180 after a specified period of time while operating the heating system 170 in a particular manner. The control engine 106 can adjust such a forecast (e.g., every hour, when new information from a user 150 or a sensor device 151 is received) periodically or based on some event (e.g., an instruction from a user 150, heating the body of water 180 to a target temperature).

The control engine 106 can provide power, control, communication, and/or other similar signals to a user 150 (including an associated user system), the power supply 135, and the managed water system 190 (including components thereof). Similarly, the control engine 106 can receive power, control, communication, and/or other similar signals from a user 150 (including an associated user system), the power supply 135, and the managed water system 190. The control engine 106 can control each sensor 151, valve 152, and/or other component in the managed water system 190 automatically (for example, based on one or more algorithms 133 and/or protocols 132 stored in the storage repository 130) and/or based on power, control, communication, and/or other similar signals received from another device through a signal transfer link 105 and/or a power transfer link 185. The control engine 106 can also, in some cases, control the power supply 135. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the system 100. For example, the control engine 106 can interact with an inventory management system by ordering a component (e.g., a sensor device 151, a burner for the heating system 170) to replace a failed, failing, or diminished component, as determined by the control engine 106. As another example, the control engine 106 can interact with a workforce scheduling system by scheduling a maintenance crew to repair or replace a component of the system 100 (e.g., a motor of the circulation system 140) when the control engine 106 determines that the component requires maintenance or replacement.

In certain example embodiments, the control engine 106 can include an interface that enables the control engine 106 to communicate with one or more components (e.g., a user 150, the circulation system 140) of the system 100. For example, if a user system of a user 150 operates under IEC Standard 62386, then the user system of the user 150 can have a serial communication interface that will transfer data (e.g., stored data 134) measured by the sensors 151. In such a case, the control engine 106 can also include a serial interface to enable communication with the user system of the user 150. Such an interface can operate in conjunction with, or independently of, the protocols 132 used to communicate between the controller 104 and a user 150 (including an associated user system), the power supply 135, and the managed water system 190 (or components thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user system), the power supply 135, and the managed water system 190 (or components thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power supply 135, the managed water system 190 (or components thereof), and/or the users 150 (including associated user systems) and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between the managed water system 190 (or components thereof), the power supply 135, and a user 150 (including an associated user system) by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from a user 150 (including an associated user system), based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the heating system 170 of the managed water system 190, a sensor 151, a valve 152) of the system 100. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the controller 104. For example, 240 VAC received from the power supply 135 by the power module 112 can be converted to 12 VDC by the power module 112. The power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be or include a source of power in itself to provide signals to the other components of the controller 104. For example, the power module 112 can be or include a battery. As another example, the power module 112 can be or include a localized photovoltaic power system. In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The optional energy metering module 111 of the controller 104 can measure one or more components of power (e.g., current, voltage, resistance, VARs, watts) at one or more points (e.g., output of the power supply 135) associated with the system 100. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. If there is no energy metering module 111, then the controller 104 can estimate one or more components of power using one or more protocols 132 and/or one or more algorithms 133.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by a user system of a user 150, the power supply 135, and the managed water system 190 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the users 150 (including associated user systems), the power supply 135, and the managed water system 190 (or portions thereof). The transceiver 124 can include a transmitter, a receiver, or a combination of the two. The transceiver 124 can use wired and/or wireless technology. The transceiver 124 can be configured in such a way that the control and/or communication signals sent and/or received by the transceiver 124 can be received and/or sent by another transceiver that is part of a user 150 (including an associated user system), the power supply 135, and the managed water system 190 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, BLE, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for a user system of a user 150, the power supply 135, and the managed water system 190 (or portions thereof) can be part of the stored data 134 (or similar areas) of the storage repository 130.

Optionally, in one or more example embodiments, the security module 128 secures interactions between the controller 104, the users 150, the power supply 135, and the managed water system 190 (or portions thereof). More specifically, the security module 128 authenticates communication from software based on security keys verifying the identity of the source of the communication. For example, user software may be associated with a security key enabling the software of a user system of a user 150 to interact with the controller 104 and/or the sensors 151. Further, the security module 128 can restrict receipt of information, requests for information, and/or access to information in some example embodiments.

Figure 2:
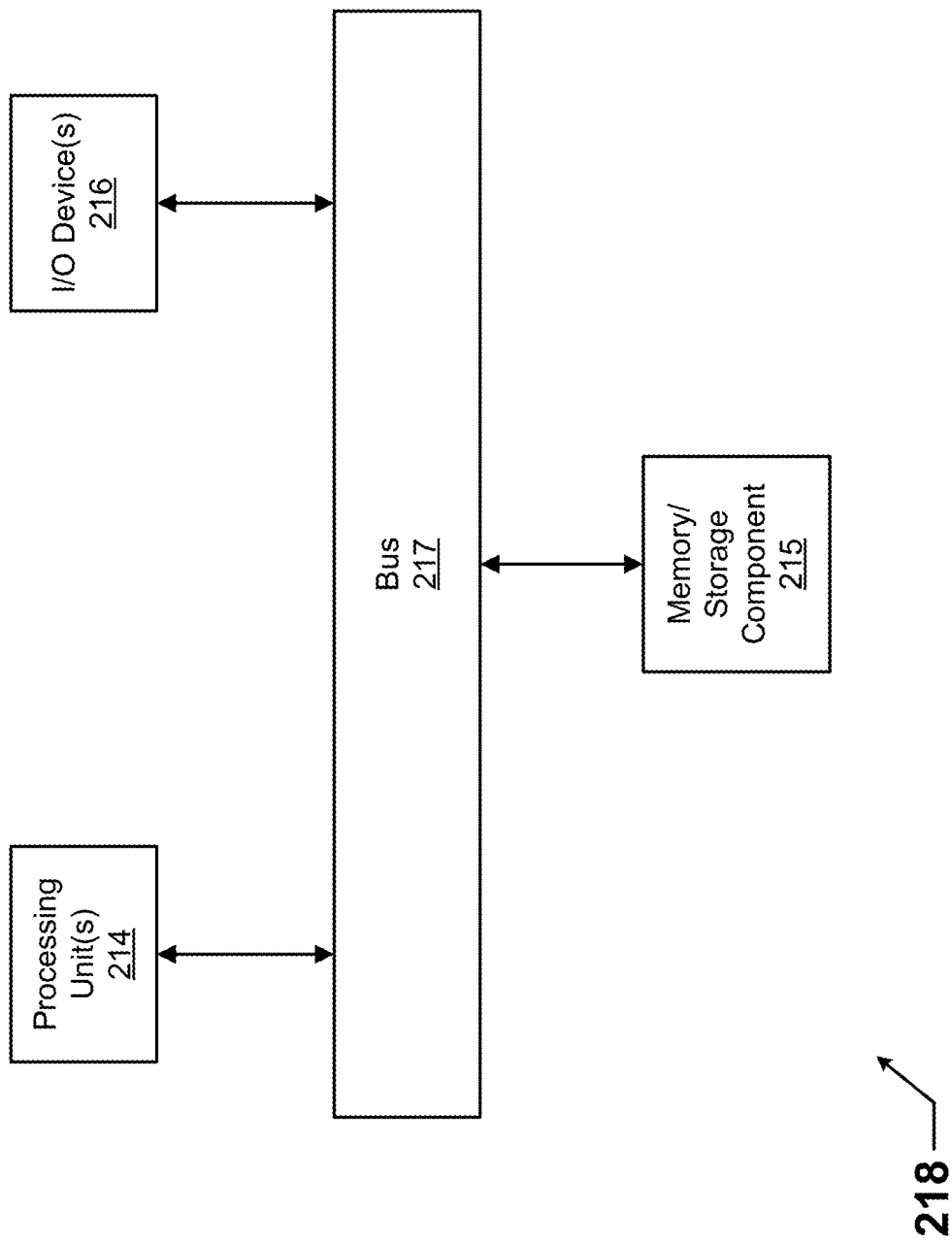
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. For example, the controller 104 of FIGS. 1A and 1B can be a computing device 218, and its various components (e.g., transceiver 124, storage repository 130, control engine 106) can be components of a computing device 218, as discussed below. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3A:
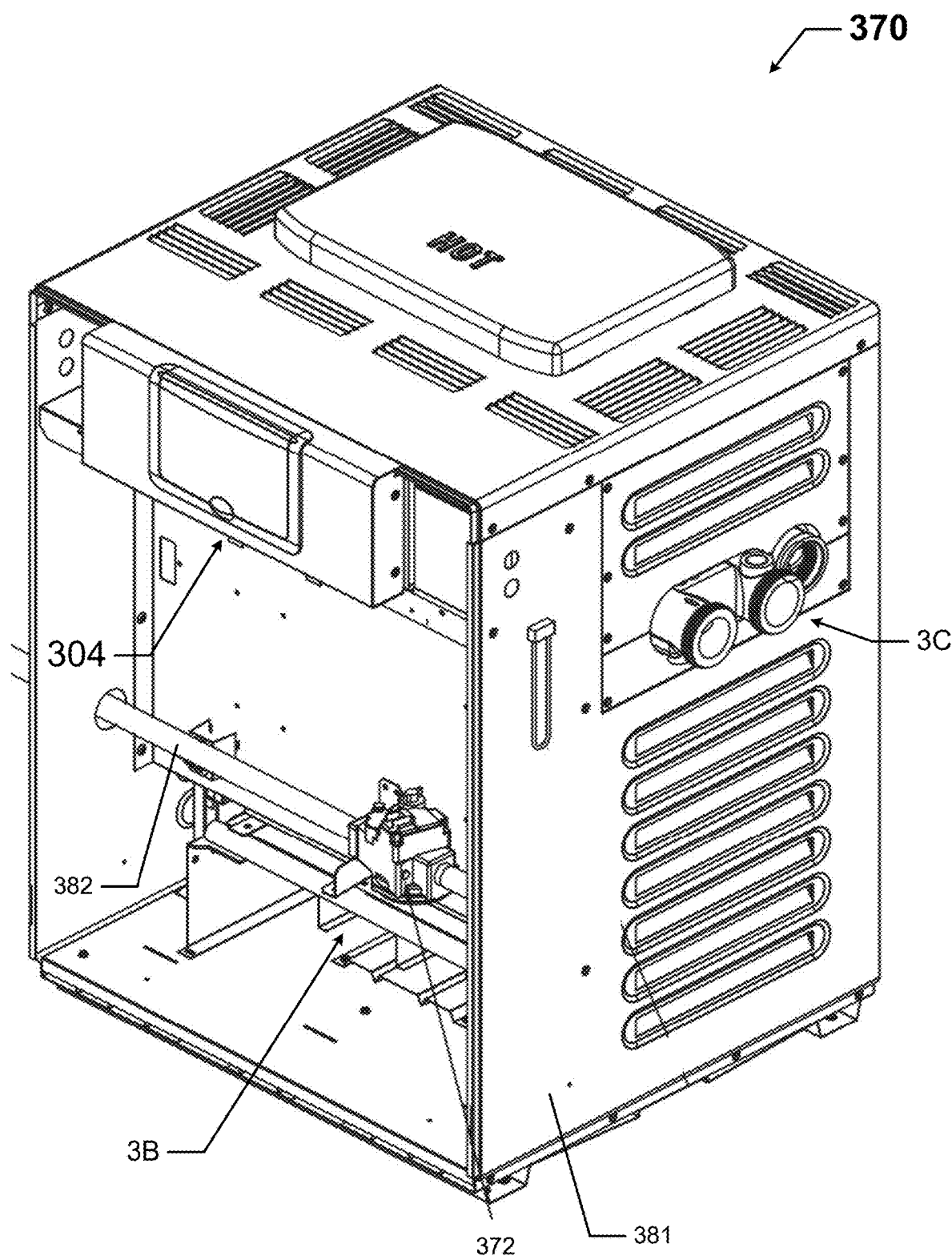
Figure 3B:
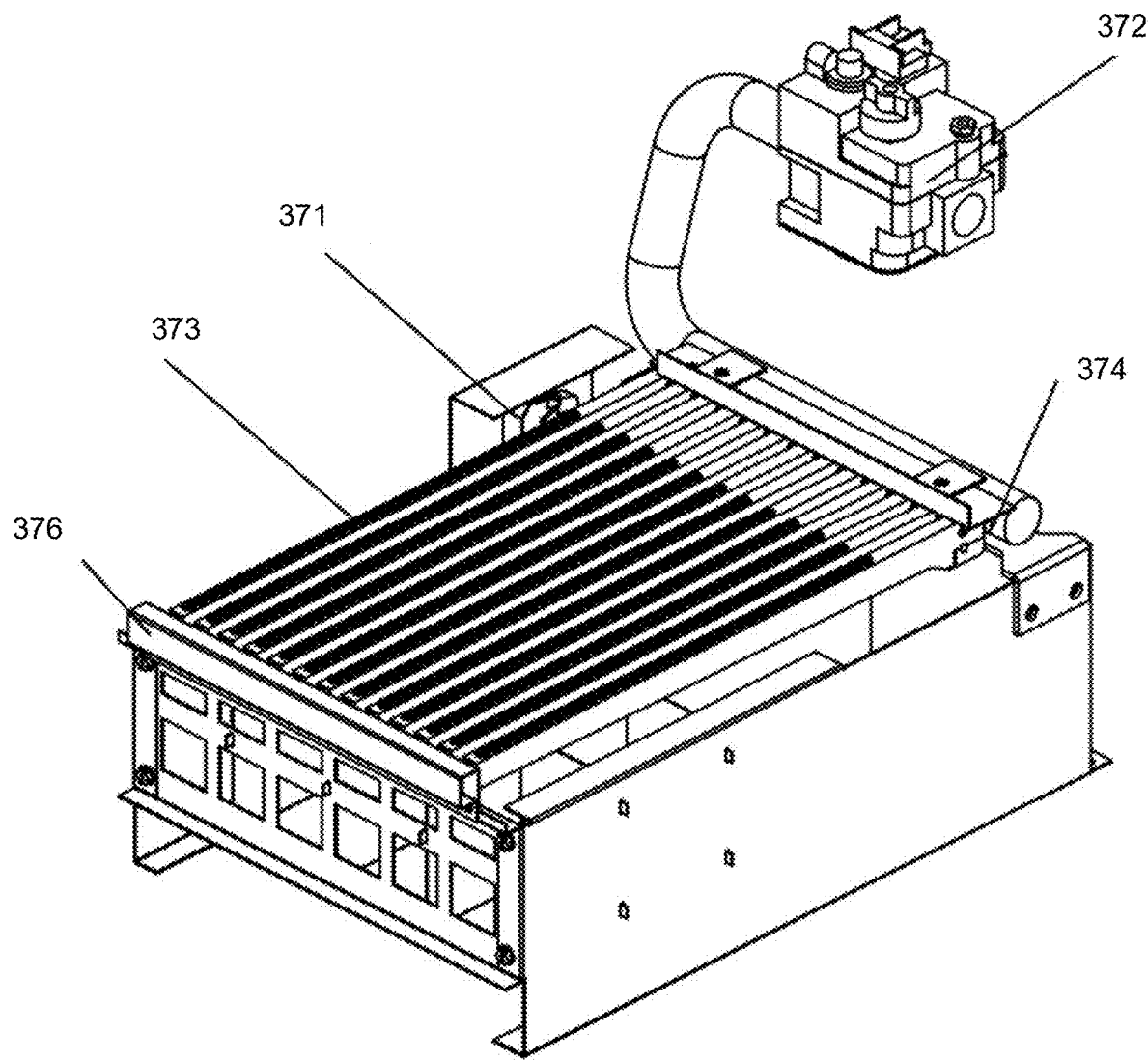
Figure 3C:
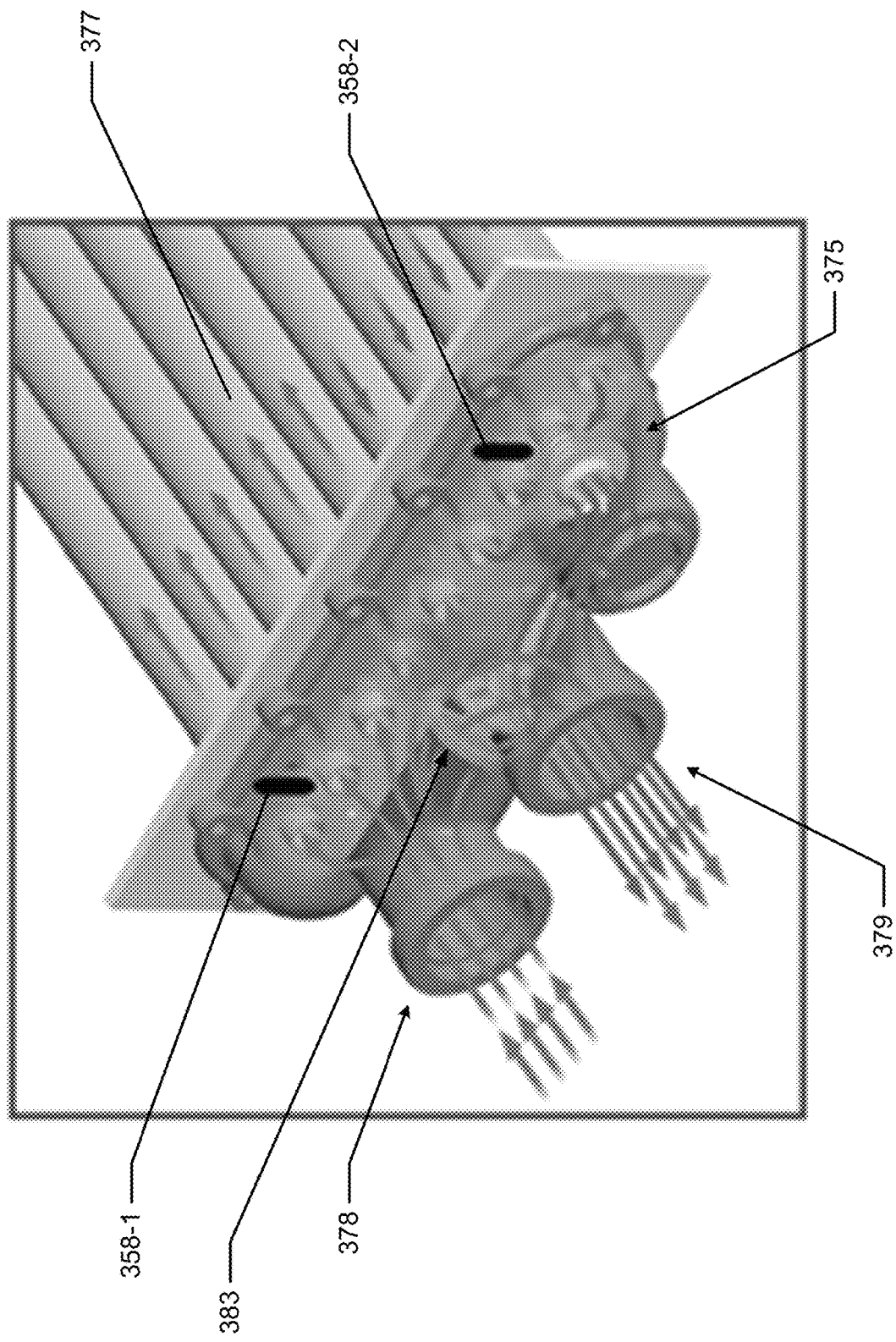

FIGS. 3A through 3D show various views of a heating system 370 in accordance with certain example embodiments. Specifically, FIG. 3A shows a top-front-side perspective view of the heating system 370, which in this case is in the form of a heater and where a front panel is removed to allow for access into the interior of the heater. FIG. 3B shows a detailed view of a subassembly 360 of the heating system 370 of FIG. 3A. FIG. 3C shows a detailed view of another subassembly 365 of the heating system 370 of FIG. 3A. FIG. 3D shows an exploded view of the mechanical thermostatic valve 375 of the heating system 300.

Referring to FIGS. 1A through 3D, the heating system 380 of FIGS. 3A through 3C is an example of the heating system 170 discussed above with respect to FIGS. 1A and 1B. In this case, the heating system 370 is a heater that includes multiple components. For example, as shown in FIGS. 3A through 3D, the heater of the heating system 370 can include a housing 381, inside of which can be disposed a gas valve 372, a number of heat exchanger (HX) tubes 377, a number of burners 373, a pilot 371, a hold-down bracket 376 for the burners 373, a gas orifice 374, and a controller 304, where the controller 304 is substantially similar to the controller 104 discussed above. Components such as the burners 373 and the HX tubes 377 can be part of a heat exchanger.

There can also be one or more components of the heater of the heating system 370 disposed on the housing 379. For example, as shown in FIGS. 3A through 3C, there can be a mechanical thermostatic valve 375 (also sometimes called a unitherm governor 375 or UG 375 herein), an optional bypass valve 383, an inlet temperature sensor 358-1, an outlet temperature sensor 358-2, an inlet port 378, and an outlet port 379. The inlet port 378 can be configured to couple to the piping system (e.g., piping system 184) to receive a body of water or other fluid flowing through the piping system from a vessel (e.g., vessel 119). The outlet port 379 can be configured to couple to the piping system to send a body of water or other fluid through the piping system to the vessel. The fluid flowing through the outlet port 379 can be entirely from the HX tubes 377, or a mixture of the output of the HX tubes 377 mixed with some amount of fluid flowing through the optional bypass valve 383.

The optional bypass valve 383 can be used to divert some amount of the fluid received through the inlet port 378 from entering the HX tubes 377. In such a case, the diverted fluid is mixed with the fluid exiting the HX tubes 377 before entering the outlet port 379. The position of the bypass valve 383, if one exists, can be controlled automatically (e.g., based on pressure or flow rate of the fluid, based on the temperature of the fluid, based on an amount of time) or by the controller 304. Various examples of the position of a bypass valve and a mechanical thermostatic valve 375 (corresponding to different modes of operation) are shown below with respect to FIGS. 5 through 13.

The mechanical thermostatic valve 375 can have one or more of any of a number of configurations. For example, as shown in FIG. 3D, the mechanical thermostatic valve 375 can include a sealing member 366 (e.g., a gasket, an O-ring), a plug 367 (also sometimes called a housing 367), and a governor 368. The governor 368 rotates relative to the housing 367 based on the temperature of the fluid flowing against the mechanical thermostatic valve 375. Openings in the governor 368 can align with openings in the plug 367 when the fluid is at certain temperatures, allowing some amount of the fluid to flow through the aligned openings in the governor 368 and the plug 367. The sealing member 366 is configured to prevent additional fluid from passing through the governor 368 and the plug 367 aside from what fluid flows through their aligned windows. In some cases, as in the embodiment shown in FIG. 3D, a minimal amount of fluid still flows through the mechanical thermostatic valve 375 when the mechanical thermostatic valve 375 is completely closed. In other words, such a mechanical thermostatic valve 375 can have bleed holes or similar features that allow for this minimal flow of fluid (e.g., water) therethrough.

Example embodiments differ from heating systems currently used in the art in a few ways. First, example embodiments have the inlet temperature sensor 358-1 that measures the temperature of water (or other fluid) entering the HX tubes 377 from the inlet port 378 and the outlet temperature sensor 358-2 that measures the temperature of water (or other fluid) leaving the HX tubes 377 toward the outlet port 379. In the current art, heating systems in the form of heaters only have an inlet temperature sensor 358-1 for fluid entering the HX tubes 377 from the inlet port 378 and lack a temperature sensor 358-2 for fluid exiting the HX tubes 377 toward the outlet port 379. Second, example embodiments use the controller 304 to calculate the position of the mechanical thermostatic valve 375 at various points in time based on one or more of a number of conditions.

For heating systems that currently exist in the art, such as a heating system in the form of a heater, the nameplate information about the capabilities of the heater are often inflated (e.g., by up to 120%) compared to actual operating performance. For example, reduced setpoint of the gas valve 372, incorrect pressures associated with the fuel (e.g., natural gas) used by the burners 373, differences in gas heating system components (e.g., burners 373, valves) across manufacturers and ranges of tolerances within a manufacturing line, and improper or imperfect sizing of the fuel piping 382 can all be factors that contribute to an incorrect calculation of the performance of the heating system.

The mechanical thermostatic valve 375 is designed to control the flow of fluid (e.g., water) through the HX tubes 377 of the heating system 370. While the mechanical thermostatic valve 375 is adjustable in the current art, without the information provided by the added outlet temperature sensor 358-2 and without the algorithms and protocols used by the controller 304, the actual performance of the heating system 370 will not match (e.g., will be grossly understated relative to) the estimated performance.

When the heating system 370 is a heater, there can be multiple families, and each family can have multiple modes or levels of operation. A family can represent a type, brand, and or other category of heating system 370, as represented by Table 1 below, which shows 3 different families. The modes or levels of operation within a particular family can be summarized, by way of example, by Table 2 below, where there are 5 different levels or modes. The thermostatic valve setpoint value represents when the mechanical thermostatic valve 375 begins to open as fluid flows around it. Efficiency is a calculated value (as discussed below). The maximum high temperature limit is the highest temperature (expressed in degrees Fahrenheit) allowed for that family type. The minimum flow rate (expressed in gallons per minute or gpm) and the maximum flow rate (expressed in gpm) represents limits of the fluid (e.g., water) flowing through the mechanical thermostatic valve 375. These tables can be generated and maintained by the control engine (e.g., control engine 106) of the controller 304 and stored in a storage repository (e.g., storage repository 130) as stored data (e.g., stored data 134).

TABLE 1

Lookup table

| Family | Thermostatic Valve (UG) Setpoint Value | Efficiency | Maximum High Temperature Limit (° F.) | Minimum Flow Rate | Maximum Flow Rate |
|---|---|---|---|---|---|
| A | 105 | 82% | 160 | 17.5 | 30 |
| B | 130 | 84% | 160 | 11.7 | 15.5 |
| C | 120 | 82% | 140 | 7 | 12 |

TABLE 2

UG Operation Summary table

| Level | Low end of outlet temperature range | High end of outlet temperature range | Description |
|---|---|---|---|
| 5 | 180 | | Exceeds ANSI/CSA limits for exit heat exchanger temperature |
| 4 | Maximum high limit (varies by family) | 180 | Monitor outlet temperature to control fluid flow through UG |
| 3 | UG set point + 19° F. | Maximum high limit (varies by family) | UG maximum open |
| 2 | UG set point + 5° F. | UG set point + 19° F. | UG travel between closed and maximum open |
| 1 | 50 | UG set point + 5° F. | UG closed |

Another mode of operation, referred to herein as Level 2, is where the position of the mechanical thermostatic valve 375 is changing (e.g., from closed to fully open). This level tends to be optimal in terms of extending the useful life of the heating system 370 (including portions thereof such as the HX tubes 377). In many cases, the flow rate of the fluid through the mechanical thermostatic valve 375 is linear relative to the position of the mechanical thermostatic valve 375 within the range of positions of the mechanical thermostatic valve 375.

Figure 4:
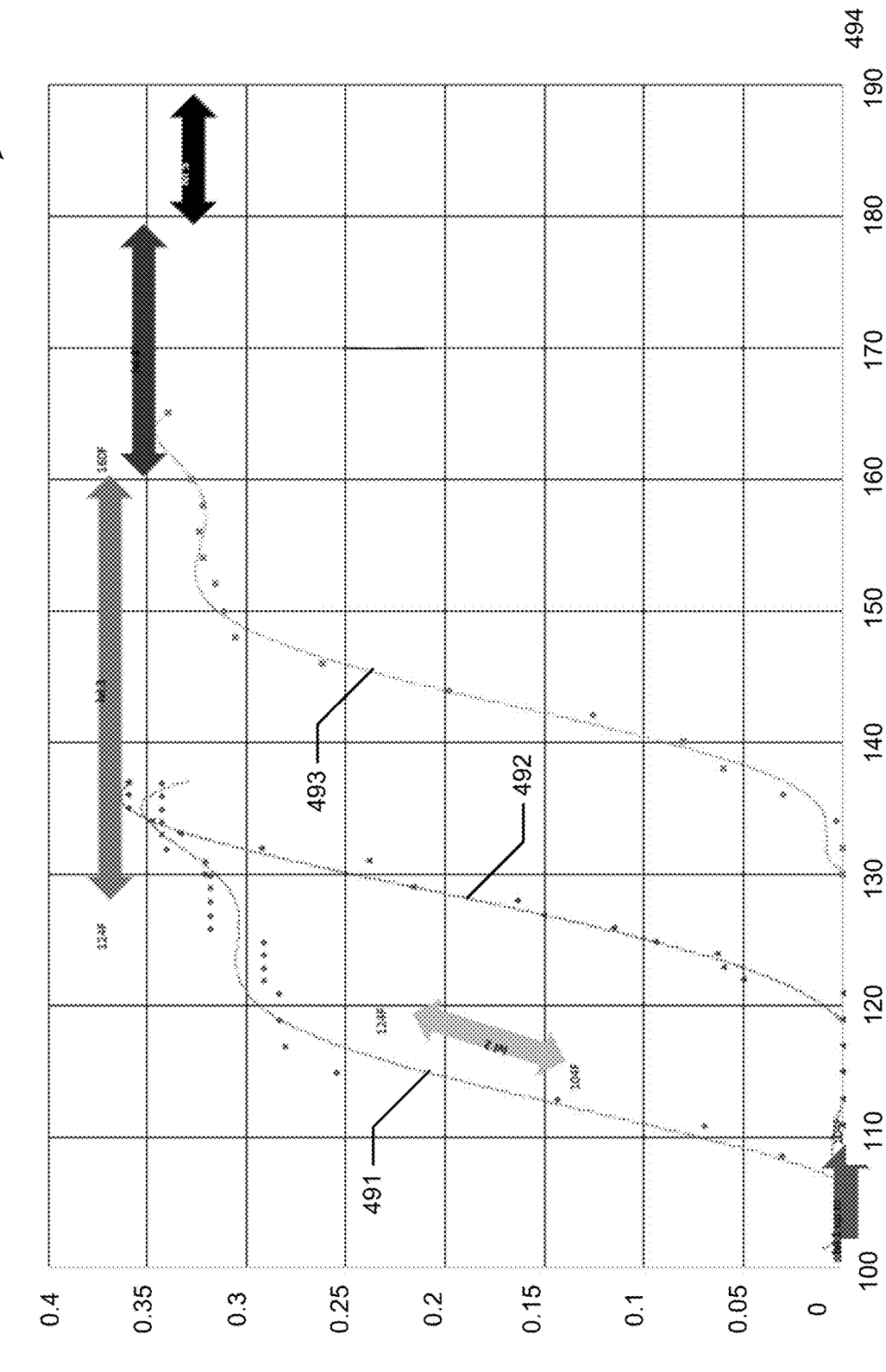
FIG. 4 shows a graph of data related to performance of a heating system in accordance with certain example embodiments.

The graph 497 of FIG. 4 shows a plot for each of three different set point values (104° F., 120° F., and 130° F.) (or, more broadly, three different families) for the mechanical thermostatic valve 375. Specifically, the graph 497 show plots of the position 496 of the mechanical thermostatic valve 375 along the vertical axis versus the temperature 494 of the water flowing through the outlet port 379 (as measured by outlet temperature sensor 358-2) along the horizontal axis. In this case, the position 496 of the mechanical thermostatic valve 375 is measured in terms of the distance (in inches) that the seal of the mechanical thermostatic valve 375 (referred to as the UG or unitherm governor in the graph 497), and the temperature 494 is measured in degrees Fahrenheit. The nominal maximum flow rate of the fluid flowing through the mechanical thermostatic valve 375 occurs when the position 496 of the mechanical thermostatic valve 375 is at 0.3 inches.

Plot 491 represents data that is measured when the setpoint value of the mechanical thermostatic valve 375 is 104° F. Plot 492 represents data that is measured when the setpoint value of the mechanical thermostatic valve 375 is 120° F. Plot 493 represents data that is measured when the setpoint value of the mechanical thermostatic valve 375 is 130° F. For all three of the plots of the graph 497, there is a substantially linear relationship between the position 496 of the mechanical thermostatic valve 375 and the temperature 494 of the fluid (e.g., water) flowing through and around the mechanical thermostatic valve 375 when the mechanical thermostatic valve 375 has just been opened (e.g., a distance 496 of 0.01 inches) and when the distance 496 is approximately 0.3 inches. In the case of plot 492 where the setpoint of the mechanical thermostatic valve 375 is 120° F., the linear relationship extends to where the distance 496 is approximately 0.36 inches.

Yet another mode of operation, referred to herein as Level 3, is where the mechanical thermostatic valve 375 is substantially fully open. This mode of operation is where the maximum flow rate of the fluid through the mechanical thermostatic valve 375 can be attained through the HX tubes 377. As shown in FIG. 4, the distance 496 (representing the openness of the mechanical thermostatic valve 375) of approximately 0.3 inches is slightly below the maximum possible opening distance of the mechanical thermostatic valve 375. For example, erosion from some of the piping 184 and/or the mechanical thermostatic valve 375 would occur if the flow rate of the fluid (e.g., water) was increased beyond what is regulated when the distance 496 is 0.3 inches. The flowrate of the fluid (e.g., water) for this mode of operation can be found in a lookup table, such as what is shown above.

Still another mode of operation, referred to herein as Level 4, is where the thermostatic valve 375 is substantially fully open, and also where the temperature of the fluid flowing out of the HX tubes 377 toward the outlet port 379, as measured by outlet temperature sensor 358-2, is between 160° F. and 180° F. In this mode of operation, the thermostatic valve 375 is substantially open with a temperature, measured by inlet temperature sensor 358-1 at the entry to the HX tubes 377 adjacent to the inlet port 378, that is higher than expected or considered safe. This condition also results in the high temperature at the outlet port 379 because the flow of fluid (e.g., water) remains at a maximum.

Yet another mode of operation, referred to herein as Level 5, is where the position of the mechanical thermostatic valve 375 is unknown, and also where the temperature, as measured by outlet temperature sensor 358-2, of the fluid flowing out of the HX tubes 377 toward the outlet port 379 is above 180° F. In this mode of operation, a safety measure, driven by the controller 304, kicks in when the the temperature of the fluid flowing out of the HX tubes 377 toward the outlet port 379, as measured by outlet temperature sensor 358-2, exceeds 180° F. in violation of ANSI Z21.56.

For example, for a particular family (e.g., family A), one mode or level of operation, referred to herein as Level 1, is where the mechanical thermostatic valve 375 is closed. In such a case, there is a minimum flow rate of water or other fluid flowing through the HX tubes 377. This minimum flow rate of fluid is substantially constant until the temperature (as read, for example, by temperature sensor 385-1 or temperature sensor 385-2) reaches a threshold value. Any increased flow of fluid through the mechanical thermostatic valve 375 during this mode of operation would cause an increase to condensation within the HX tubes 377 and reduce the useful life of the heating system 370. This flowrate of the fluid through the mechanical thermostatic value 375 can be bounded, as shown in the lookup table above.

As shown by the example lookup table above, Levels 1, 2, and 3, calculated values of the flow of fluid through the mechanical thermostatic valve 375, performed by the controller 304, can be used. By contrast, since Levels 4 and 5 are more for safety than normal operations, a lookup table may not be needed. In such a case, the operating parameters for Levels 4 and 5 can be written into the software executed by the controller 304. The formula to calculate the efficiency (as listed in the lookup table above) can be as follows:

Equation (1): $Eff=(C \times FR \times \Delta T) \div IR$, where Eff is the efficiency of the heating system 370, C is a numerical designation for the fluid in the vessel 119 (e.g., 500 for water), FR is the flow rate of the body of water (e.g., body of water 180), $\Delta T$ is the difference in temperature of the body of water (or other fluid) flowing through the heating system 370 between the measurement made by the inlet temperature sensor 358-1 at the input port 378 and the measurement made by the outlet temperature sensor 358-2 at the output port 379, and IR is the input rate of the fuel (e.g., natural gas, propane) used by the heater of the heating system 370. C can be calculated as the weight per gallon of the fluid times the specific heat of the fluid times a unit of time (e.g., 60 minutes). In some cases, values of C for different fluids can be listed in a lookup table (part of the stored data 134), and the user (e.g., user 150) can use an app on the user device (e.g., user device 155) to select the fluid circulating through the heating system 370.

In some cases, the FR can be predetermined by a lookup table (as with a fixed speed motor used for the circulation system 135). The calculated value of Eff can vary based on one or more factors, including but not limited to the speed of a pump motor of the circulation system 135, selection of heater components such as a blower or heat exchanger, altitude of location of the managed water system 190 (or portions thereof), gas pressure, quality of gas, and age of the equipment of the circulation system 135 and/or the heating system 170. In some cases, Eff is predetermined by the lookup table. In such a case, the input rate (IR) can be calculated using the following equation:

Equation (2): $IR=(C \times FR \times \Delta T) \div Eff$, where Eff is the efficiency of the heating system 370, C is a numerical designation for the fluid in the vessel 119 (e.g., 500 for water), FR is the flow rate of the body of water (e.g., body of water 180), $\Delta T$ is the difference in temperature of the body of water (or other fluid) flowing through the heating system 370 between the measurement made by the inlet temperature sensor 358-1 at the input port 378 and the measurement made by the outlet temperature sensor 358-2 at the output port 379, and IR is the input rate of the fuel (e.g., natural gas, propane) used by the heater of the heating system 370.

An example of a simulation is shown by the inputs and fields of the following Table 3:

| | |
|---|---|
| Temperature (inlet) in ° F. | 50 |
| Temperature (outlet) in ° F. | 80 |
| Family ID | 2 |
| UG Setpoint Value | 130 |
| Efficiency | 84% |
| Maximum High Temperature Limit (° F.) | 160 |
| Minimum Flow Rate (gpm) | 11.7 |
| Maximum Flow Rate (gpm) | 15.5 |
| Level | 1 |
| UG Travel % | −3.6 |
| UG Travel delta | 3.8 |
| UG Travel Flow | 11.7 |
| Flow through HX Tubes | 11.7 |
| ΔT | 30 |
| Checkpoint | 0 |
| IR | 208929 | where Temperature (inlet) is measured by inlet temperature sensor 358-1; where Temperature (outlet) is measured by outlet temperature sensor 358-2; where Family ID, UG Setpoint Value, Efficiency, Maximum High Temperature Limit, Minimum Flow Rate, and Maximum Flow Rate are taken from the example lookup table shown above; where the Level is determined based on the data that corresponds to the lookup table; where UG Travel %, UG Travel delta, and UG Travel Flow are calculated values; where ΔT is calculated as the difference between Temperature (outlet) and Temperature (inlet); where Checkpoint is an error code; and where IR is a calculated value using Equation (2) above.

In this first simulation, the following Table 4 can be generated based on an IR value of 208929:

| Fluid Flow Rate | ΔT | Inlet Temperature | | | | | | | | | | | |
|---|---|---|---|---|---|---|---|---|---|---|---|---|---|
| | | 50 | 55 | 60 | 65 | 70 | 75 | 80 | 85 | 90 | 95 | 100 | 104 |
| 11.7 | 30 | 80.0 | 85.0 | 90.0 | 95.0 | 100.0 | 105.0 | 110.0 | 115.0 | 120.0 | 125.0 | 130.0 | 134.0 |
| 12.08 | 29.1 | 79.1 | 84.1 | 89.1 | 94.1 | 99.1 | 104.1 | 109.1 | 114.1 | 119.1 | 124.1 | 129.1 | 133.1 |
| 12.46 | 28.2 | 78.2 | 83.2 | 88.2 | 93.2 | 98.2 | 103.2 | 108.2 | 113.2 | 118.2 | 123.2 | 128.2 | 132.2 |
| 12.84 | 27.3 | 77.3 | 82.3 | 87.3 | 92.3 | 97.3 | 102.3 | 107.3 | 112.3 | 117.3 | 122.3 | 127.3 | 131.3 |
| 13.22 | 26.4 | 76.6 | 81.6 | 86.6 | 91.6 | 96.6 | 101.6 | 106.6 | 111.6 | 116.6 | 121.6 | 126.6 | 130.6 |
| 13.6 | 25.8 | 75.8 | 80.8 | 85.8 | 90.8 | 95.8 | 100.8 | 105.8 | 110.8 | 115.8 | 120.8 | 125.8 | 129.8 |
| 13.98 | 25.1 | 75.1 | 80.1 | 85.1 | 90.1 | 95.1 | 100.1 | 105.1 | 110.1 | 115.1 | 120.1 | 125.1 | 129.1 |
| 14.36 | 24.4 | 74.4 | 79.4 | 84.4 | 89.4 | 94.4 | 99.4 | 104.4 | 109.4 | 114.4 | 119.4 | 124.4 | 128.4 |
| 14.74 | 23.8 | 73.8 | 78.8 | 83.8 | 88.8 | 93.8 | 98.8 | 103.8 | 108.8 | 113.8 | 118.8 | 123.8 | 127.8 |
| 15.12 | 23.2 | 73.2 | 78.2 | 83.2 | 88.2 | 93.2 | 98.2 | 103.2 | 108.2 | 113.2 | 118.2 | 123.2 | 127.2 |

An example of another simulation is shown by the inputs and fields of the following Table 5:

| | |
|---|---|
| Temperature (inlet) in ° F. | 50 |
| Temperature (outlet) in ° F. | 140 |
| Family ID | 2 |
| UG Setpoint Value | 130 |
| Efficiency | 84% |
| Maximum High Temperature Limit (° F.) | 160 |
| Minimum Flow Rate (gpm) | 11.7 |
| Maximum Flow Rate (gpm) | 15.5 |
| Level | 2 |
| UG Travel % | 0.4 |
| UG Travel delta | 3.8 |
| UG Travel Flow | 13.2 |
| Flow through HX Tubes | 13.2 |
| ΔT | 90 |
| Checkpoint | 0 |
| IR | 708214 |

In this second simulation, the following Table 6 can be generated based on an IR value of 708214:

| Fluid Flow Rate | ΔT | Inlet Temperature | | | | | | | | | | | |
|---|---|---|---|---|---|---|---|---|---|---|---|---|---|
| | | 50 | 55 | 60 | 65 | 70 | 75 | 80 | 85 | 90 | 95 | 100 | 104 |
| 11.7 | 101.7 | 151.7 | 156.7 | 161.7 | 166.7 | 171.7 | 176.7 | 181.7 | 186.7 | 191.7 | 196.7 | 201.7 | 205.7 |
| 12.08 | 98.5 | 148.5 | 153.5 | 158.5 | 163.5 | 168.5 | 173.5 | 178.5 | 183.5 | 188.5 | 193.5 | 198.5 | 202.5 |
| 12.46 | 95.5 | 145.5 | 150.5 | 155.5 | 160.5 | 165.5 | 170.5 | 175.5 | 180.5 | 185.5 | 190.5 | 195.5 | 199.5 |
| 12.84 | 92.7 | 142.7 | 147.7 | 152.7 | 157.7 | 162.7 | 167.7 | 172.7 | 177.7 | 182.7 | 187.7 | 192.7 | 196.7 |
| 13.22 | 90.0 | 140.0 | 145.0 | 150.0 | 155.0 | 160.0 | 165.0 | 170.0 | 175.0 | 180.0 | 185.0 | 190.0 | 194.0 |

-continued

| Fluid Flow Rate | ΔT | Inlet Temperature | | | | | | | | | | |
|---|---|---|---|---|---|---|---|---|---|---|---|---|
| | | 50 | 55 | 60 | 65 | 70 | 75 | 80 | 85 | 90 | 95 | 100 | 104 |
| 13.6 | 87.5 | 137.5 | 142.5 | 147.5 | 152.5 | 157.5 | 162.5 | 167.5 | 172.5 | 177.5 | 182.5 | 187.5 | 191.5 |
| 13.98 | 85.1 | 135.1 | 140.1 | 145.1 | 150.1 | 155.1 | 160.1 | 165.1 | 170.1 | 175.1 | 180.1 | 185.1 | 189.1 |
| 14.36 | 82.9 | 132.9 | 137.9 | 142.9 | 147.9 | 152.9 | 157.9 | 162.9 | 167.9 | 172.9 | 177.9 | 182.9 | 186.9 |
| 14.74 | 80.7 | 130.7 | 135.7 | 140.7 | 145.7 | 150.7 | 155.7 | 160.7 | 165.7 | 170.7 | 175.7 | 180.7 | 184.7 |
| 15.12 | 78.7 | 128.7 | 133.7 | 138.7 | 143.7 | 148.7 | 153.7 | 158.7 | 163.7 | 168.7 | 173.7 | 178.7 | 182.7 |

An example of yet another simulation is shown by the inputs and fields of the following Table 7:

| | |
|---|---|
| Temperature (inlet) in ° F. | 100 |
| Temperature (outlet) in ° F. | 160 |
| Family ID | 2 |
| UG Setpoint Value | 130 |
| Efficiency | 84% |
| Maximum High Temperature Limit (° F.) | 160 |
| Minimum Flow Rate (gpm) | 11.7 |
| Maximum Flow Rate (gpm) | 15.5 |
| Level | 4 |
| UG Travel % | 1.7 |
| UG Travel delta | 3.8 |
| UG Travel Flow | 18.3 |
| Flow through HX Tubes | 15.5 |
| ΔT | 60 |
| Checkpoint | ΔT Error—Flow through UG reduced |
| IR | 553571 |

In this first simulation, the following Table 8 can be generated based on an IR value of 553571:

| Fluid Flow Rate | ΔT | Inlet Temperature | | | | | | | | | | |
|---|---|---|---|---|---|---|---|---|---|---|---|---|
| | | 50 | 55 | 60 | 65 | 70 | 75 | 80 | 85 | 90 | 95 | 100 | 104 |
| 11.7 | 79.5 | 129.5 | 134.5 | 139.5 | 144.5 | 149.5 | 154.5 | 159.5 | 164.5 | 169.5 | 174.5 | 179.5 | 183.5 |
| 12.08 | 77.0 | 127.0 | 132.0 | 137.0 | 142.0 | 147.0 | 152.0 | 157.0 | 162.0 | 167.0 | 172.0 | 177.0 | 181.0 |
| 12.46 | 74.6 | 124.6 | 129.6 | 134.6 | 139.6 | 144.6 | 149.6 | 154.6 | 159.6 | 164.6 | 169.6 | 174.6 | 178.6 |
| 12.84 | 72.4 | 122.4 | 127.4 | 132.4 | 137.4 | 142.4 | 147.4 | 152.4 | 157.4 | 162.4 | 167.4 | 172.4 | 176.4 |
| 13.22 | 70.3 | 120.3 | 125.3 | 130.3 | 135.3 | 140.3 | 145.3 | 150.3 | 155.3 | 160.3 | 165.3 | 170.3 | 174.3 |
| 13.6 | 68.4 | 118.4 | 123.4 | 128.4 | 133.4 | 138.4 | 143.4 | 148.4 | 153.4 | 158.4 | 163.4 | 168.4 | 172.4 |
| 13.98 | 66.5 | 116.5 | 121.5 | 126.5 | 131.5 | 136.5 | 141.5 | 146.5 | 151.5 | 156.5 | 161.5 | 166.5 | 170.5 |
| 14.36 | 64.8 | 114.8 | 119.8 | 124.8 | 129.8 | 134.8 | 139.8 | 144.8 | 149.8 | 154.8 | 159.8 | 164.8 | 168.8 |
| 14.74 | 63.1 | 113.1 | 118.1 | 123.1 | 128.1 | 133.1 | 138.1 | 143.1 | 148.1 | 153.1 | 158.1 | 163.1 | 167.1 |
| 15.12 | 61.5 | 111.5 | 116.5 | 121.5 | 126.5 | 131.5 | 136.5 | 141.5 | 146.5 | 151.5 | 156.5 | 161.5 | 165.5 |

Under Example embodiments can make adjustments to a lookup table from time to time based on one or more of any of a number of factors, including but not limited to user input, new trends in historical data, new equipment in the piping system (e.g., piping system 184), and new equipment in the heating system (e.g., heating system 370). The controller 304 can track and trend historical estimates with actual results and measurements to determine the maximum ΔT that can be allowable for each family. The controller 304 can also use historical data, present measurements, and/or forecasts to determine the life expectancy of the heating system 370 (or portions thereof). Example embodiments can also establish and maintain efficiency profiles at less than 100% efficiency.

FIGS. 5 through 13 each show a diagram of a different mode of operation for the heating system 300 of FIGS. 3A through 3D. Each of FIGS. 5 through 13 include the HX tubes 377, the mechanical thermostatic valve 375, the optional bypass valve 383, the inlet temperature sensor 358-1, the outlet temperature sensor 358-2, the inlet port 378, the outlet port 379 of the system 300 of FIGS. 3A through 3D, except that each of FIGS. 5 through 13 shows the system in different modes of operation. The arrows in FIGS. 5 through 13 show the flow path of the fluid (e.g., water).

Figure 5:
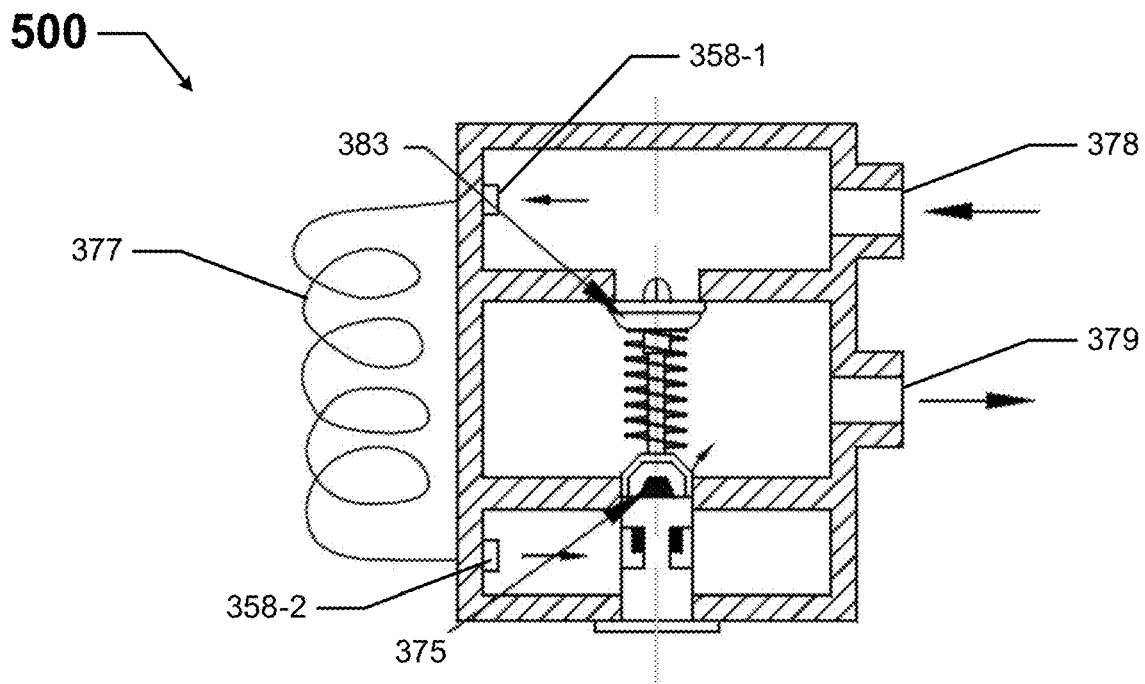
FIGS. 5 through 13 each show a diagram of a different mode of operation for the heating system of FIGS. 3A through 3D.
Figure 6:
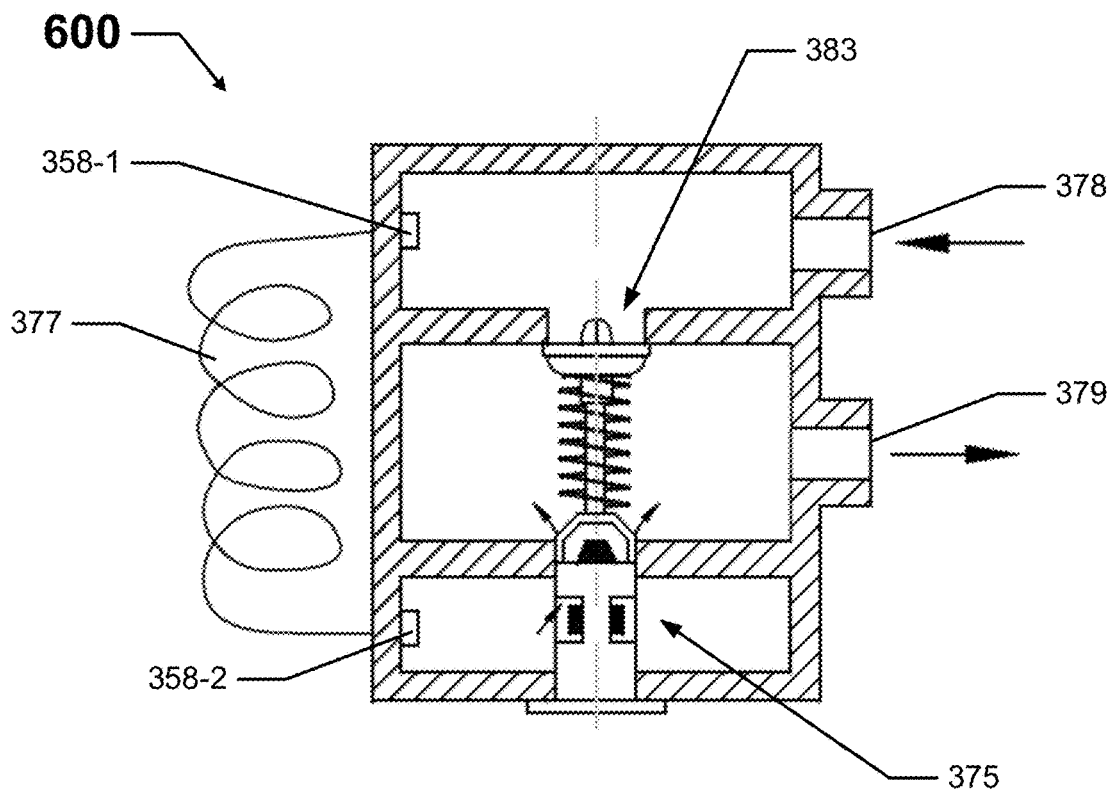

The system 500 captured in FIG. 5 shows a low flow rate (e.g., approximately 40 gpm) of the fluid and where the temperature of the fluid, as measured by inlet temperature sensor 358-1, is low (e.g., less than 50° F.). In such a case, the bypass valve 383 is completely "closed" (due to the low flow rate of the fluid) with a minimal amount of fluid flowing through bleed holes in the mechanical thermostatic valve 375. The system 600 captured in FIG. 6 shows the same low flow rate (e.g., approximately 40 gpm) of the fluid relative to the system 500 of FIG. 5, but in this case the temperature of the fluid, as measured by inlet temperature sensor 358-1, is at a nominal temperature (e.g., approximately 80° F.). In such a case, the bypass valve 383 remains completely "closed" (due to the low flow rate of the fluid), but with the increased temperature of the fluid, the mechanical thermostatic valve 375 is partially open to allow for an increased flow of fluid therethrough relative to the system 500 of FIG. 5.

Figure 7:
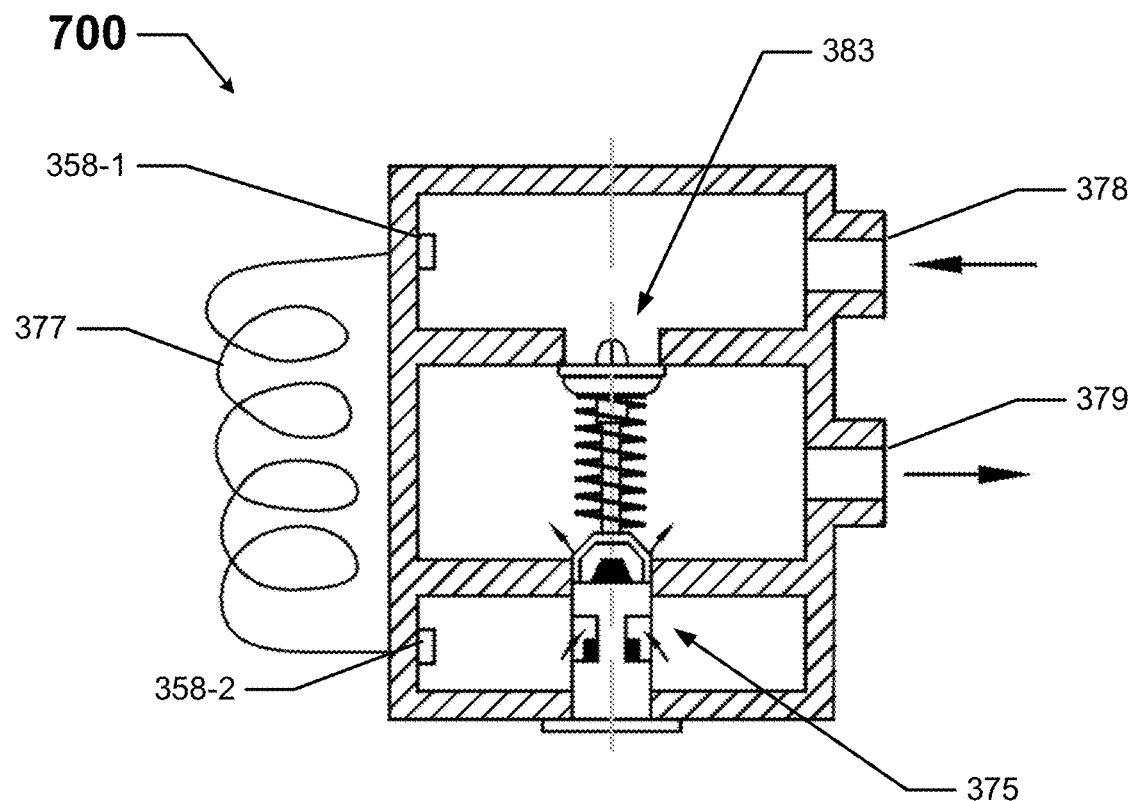

The system 700 captured in FIG. 7 shows the same low flow rate (e.g., approximately 40 gpm) of the fluid relative to the systems of FIGS. 5 and 6, but in this case the temperature of the fluid, as measured by inlet temperature sensor 358-1, is at a high temperature (e.g., approximately 102° F.). In such a case, the bypass valve 383 still remains completely "closed" (due to the low flow rate of the fluid), but with the high temperature of the fluid, the mechanical thermostatic valve 375 is fully open to allow for a maximum flow of fluid therethrough relative to the systems of FIGS. 5 and 6.

Figure 8:
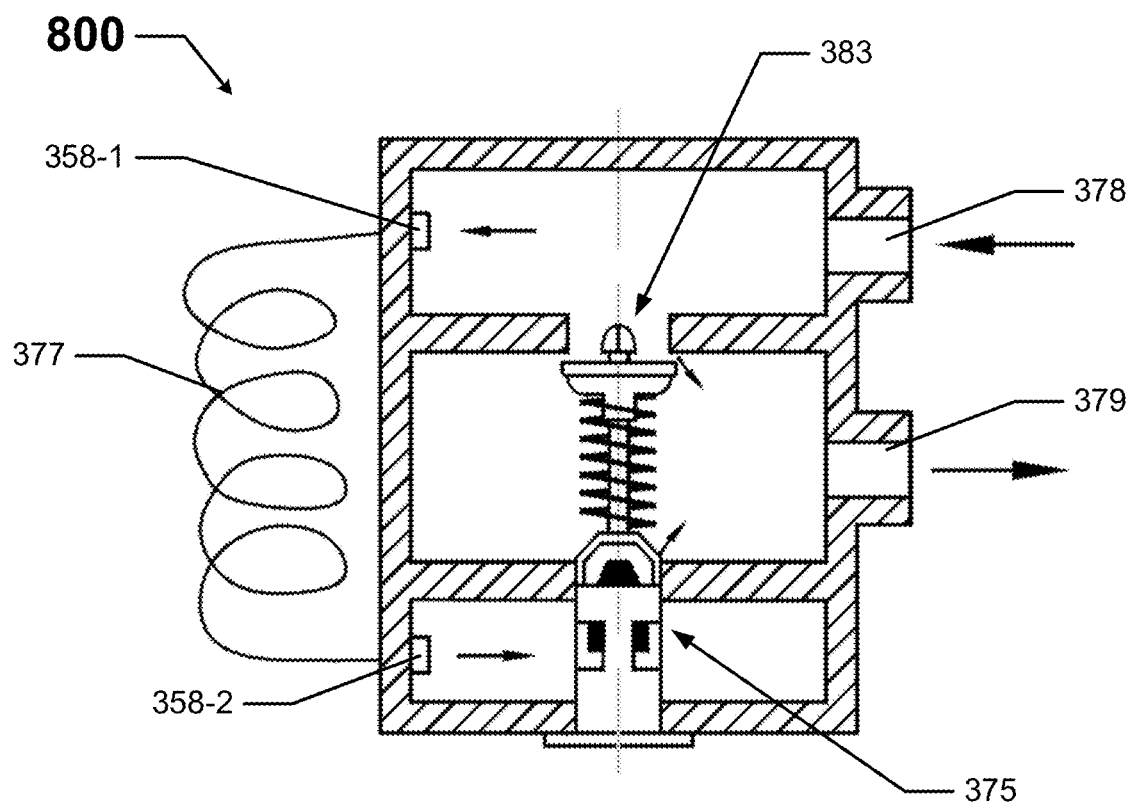
Figure 9:
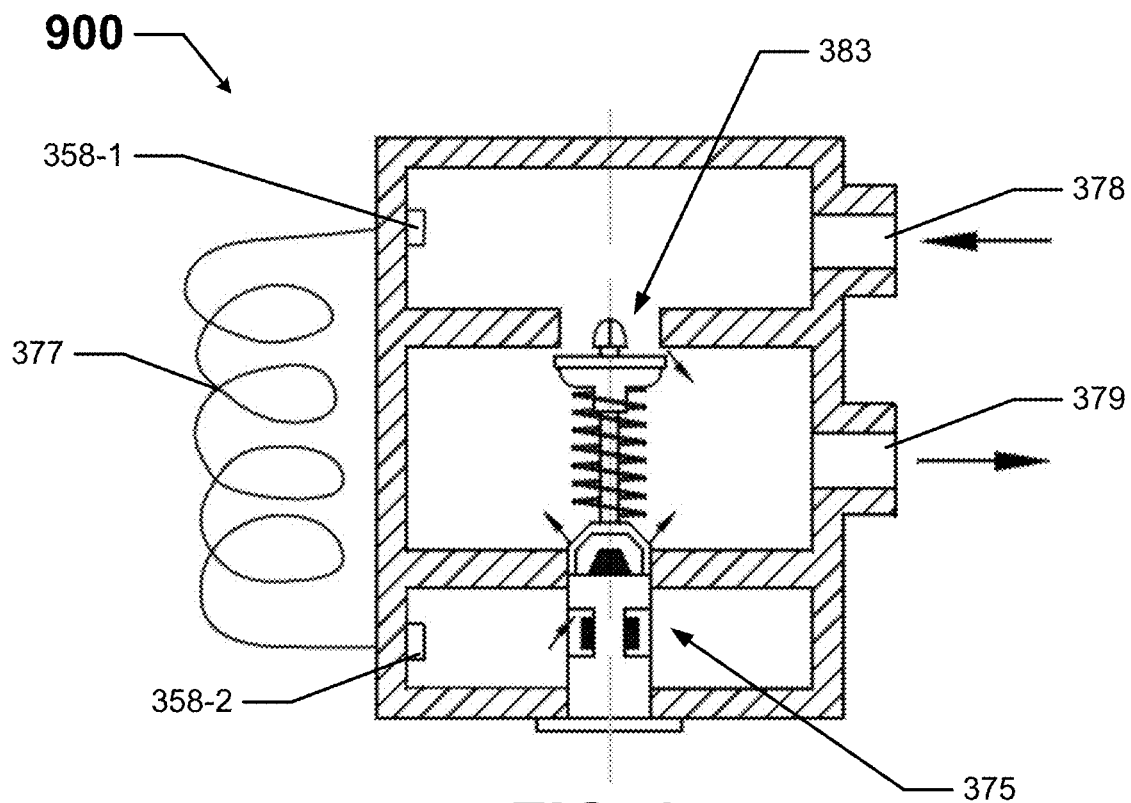

The system 800 captured in FIG. 8 shows a nominal flow rate (e.g., approximately 60 gpm) of the fluid and where the temperature of the fluid, as measured by inlet temperature sensor 358-1, is low (e.g., less than 50° F.). In such a case, the bypass valve 383 is partially open (due to the nominal flow rate of the fluid) with a minimal amount of fluid flowing through bleed holes in the mechanical thermostatic valve 375. The system 900 captured in FIG. 9 shows the same nominal flow rate (e.g., approximately 60 gpm) of the fluid relative to the system 800 of FIG. 8, but in this case the temperature of the fluid, as measured by inlet temperature sensor 358-1, is at a nominal temperature (e.g., approximately 80° F.). In such a case, the bypass valve 383 remains partially open (due to the low flow rate of the fluid), but with the increased temperature of the fluid, the mechanical thermostatic valve 375 is partially open to allow for an increased flow of fluid therethrough relative to the system 800 of FIG. 8.

Figure 10:
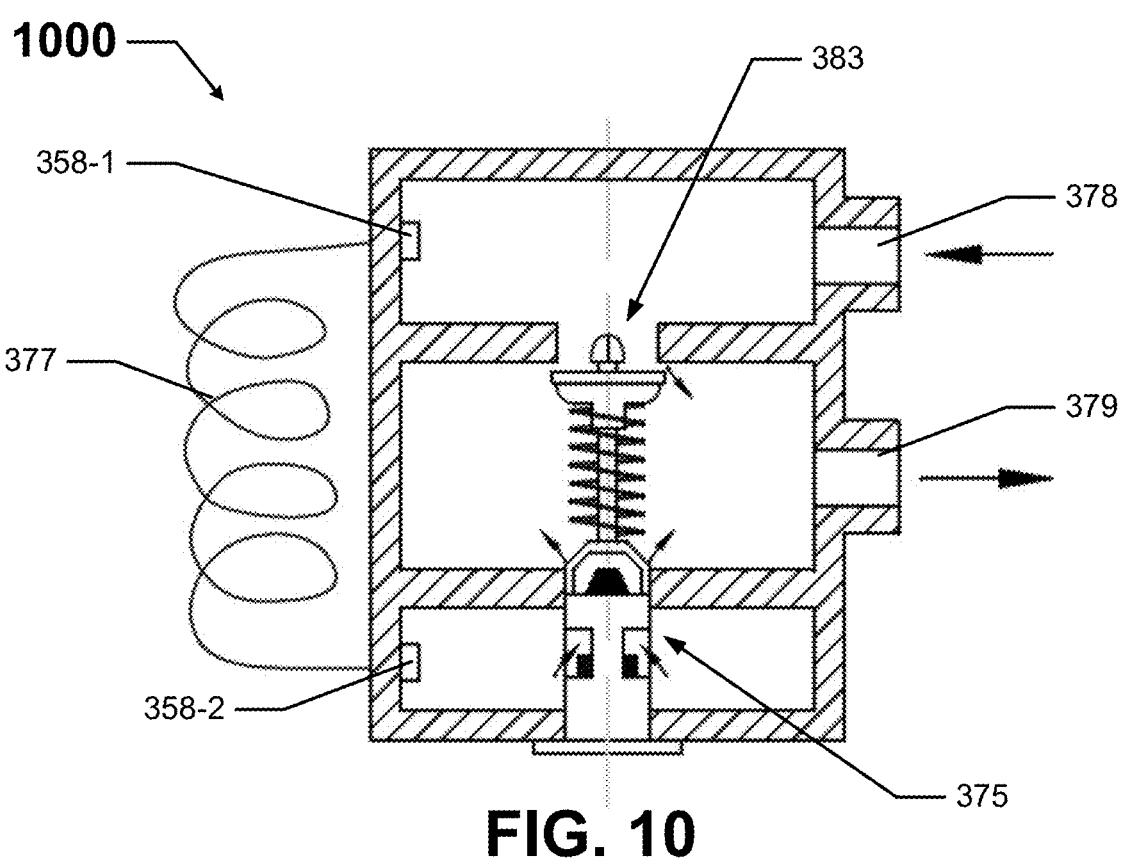

The system 1000 captured in FIG. 10 shows the same nominal flow rate (e.g., approximately 60 gpm) of the fluid relative to the systems of FIGS. 8 and 9, but in this case the temperature of the fluid, as measured by inlet temperature sensor 358-1, is at a high temperature (e.g., approximately 102° F.). In such a case, the bypass valve 383 still remains partially open (due to the low flow rate of the fluid), but with the high temperature of the fluid, the mechanical thermostatic valve 375 is fully open to allow for a maximum flow of fluid therethrough relative to the systems of FIGS. 8 and 9.

Figure 11:
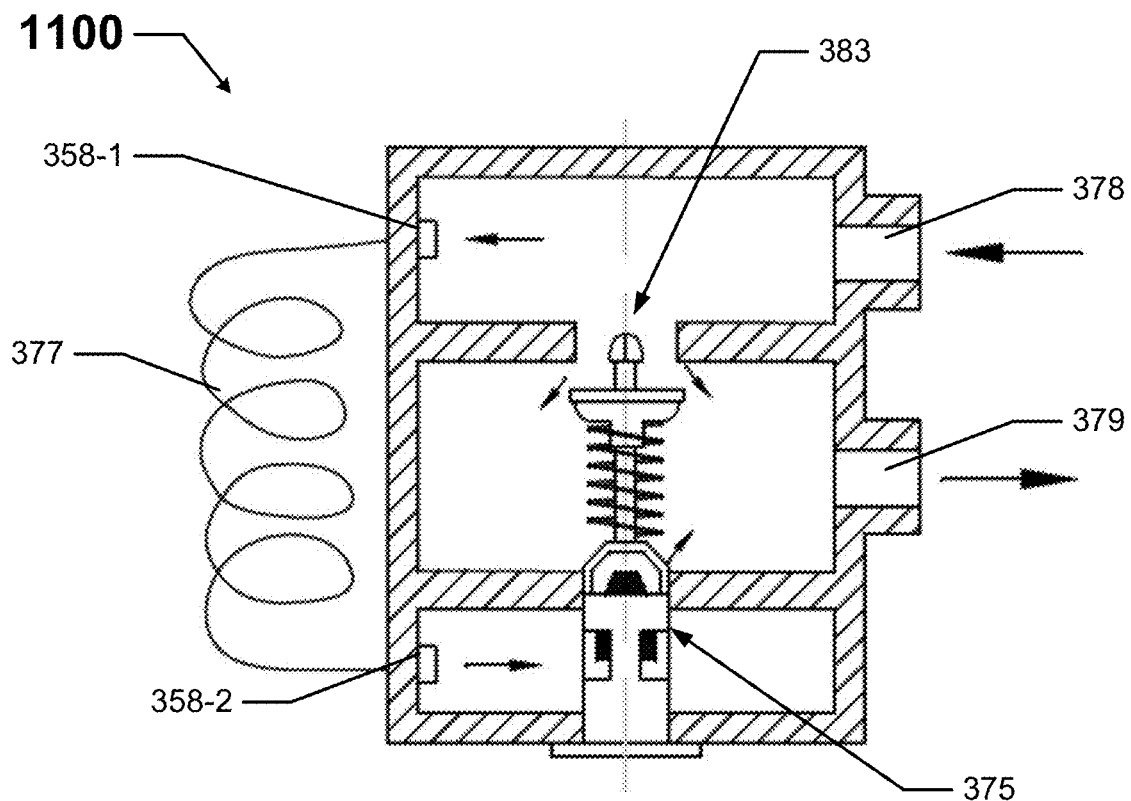
Figure 12:
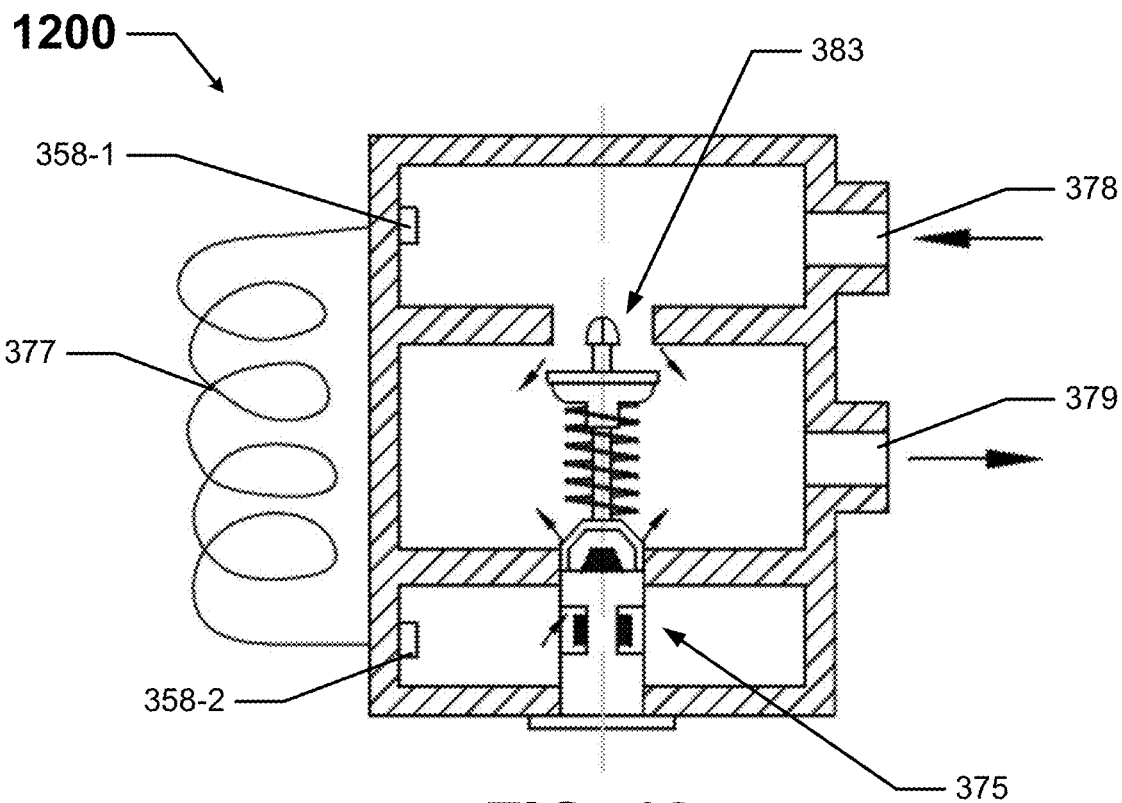

The system 1100 captured in FIG. 11 shows a high flow rate (e.g., approximately 100 gpm) of the fluid and where the temperature of the fluid, as measured by inlet temperature sensor 358-1, is low (e.g., less than 50° F.). In such a case, the bypass valve 383 is completely open (due to the high flow rate of the fluid) with a minimal amount of fluid flowing through bleed holes in the mechanical thermostatic valve 375. The system 1200 captured in FIG. 12 shows the same high flow rate (e.g., approximately 100 gpm) of the fluid relative to the system 1100 of FIG. 11, but in this case the temperature of the fluid, as measured by inlet temperature sensor 358-1, is at a nominal temperature (e.g., approximately 80° F.). In such a case, the bypass valve 383 remains completely open (due to the high flow rate of the fluid), but with the increased temperature of the fluid, the mechanical thermostatic valve 375 is partially open to allow for an increased flow of fluid therethrough relative to the system 1100 of FIG. 11.

Figure 13:
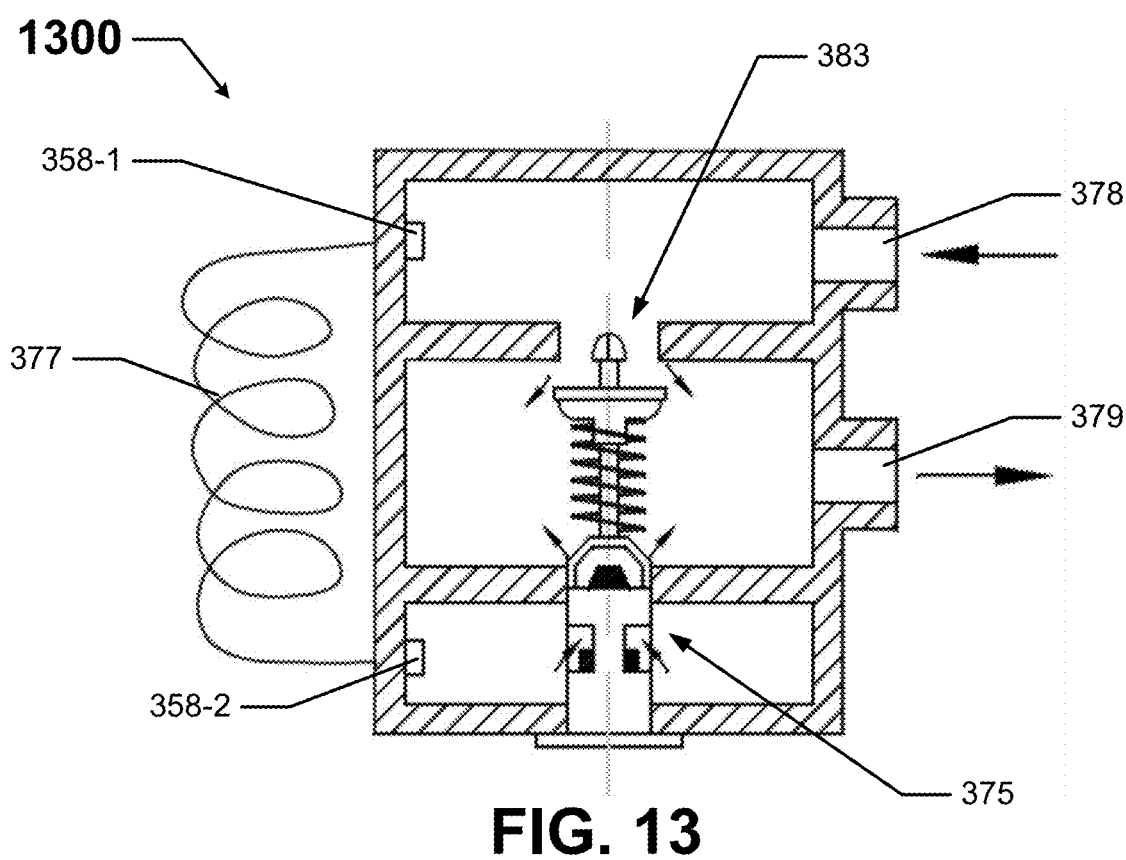

The system 1300 captured in FIG. 13 shows the same high flow rate (e.g., approximately 100 gpm) of the fluid relative to the systems of FIGS. 11 and 12, but in this case the temperature of the fluid, as measured by inlet temperature sensor 358-1, is at a high temperature (e.g., approximately 102° F.). In such a case, the bypass valve 383 still remains completely open (due to the low flow rate of the fluid), but with the high temperature of the fluid, the mechanical thermostatic valve 375 is fully open to allow for a maximum flow of fluid therethrough relative to the systems of FIGS. 11 and 12.

Example embodiments can be used to provide information and control with respect to any of a number of aspects of a heating system of a managed water system. Example embodiments can manage and control a heating system within the managed water system. Example embodiments can determine actual efficiency, performance, and other related parameters that can be used to optimize use of a heating system under a variety of operating scenarios. By having a temperature sensor at both the inlet and outlet ports of the heating system, the controller of example embodiments can make more accurate assessments of the performance of the heating system and how to control aspects (control the flow of fuel to the burner, control the flow of fluid (e.g., water) flowing through the HX tubes and/or mechanical thermostatic valve) of the heating system that maximize efficiency. Example embodiments can determine when to start heating a body of water so that the body of water reaches a target temperature at a target time. Example embodiments can be used to evaluate equipment of a heating system and, in some cases, develop and/or implement an action plan to replace failed or failing equipment of the heating system. Example embodiments can receive input and/or information from any of a number of sensor devices and/or users to make its determinations. Example embodiments can lower costs, improve efficiency, and increase the useful life of a managed water (or, more generally, fluid) system, including its various components.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A heating system of a managed fluid system, the heating system comprising:
    a heat exchanger;
    a first temperature sensor device that is configured to measure an inlet temperature of a fluid flowing into the heat exchanger;
    a second temperature sensor device that is configured to measure an outlet temperature of the fluid flowing out of the heat exchanger;
    a controller communicably coupled to the first temperature sensor device and the second temperature sensor device, wherein the controller is configured to: receive a plurality of inlet temperature measurements made by the first temperature sensor device;
    receive a plurality of outlet temperature measurements made by the second temperature sensor device;
    evaluate the plurality of inlet temperature measurements and the plurality of outlet temperature measurements using at least one lookup table and at least one algorithm, wherein the at least one lookup table comprises a correlation between the plurality of inlet temperature measurements, the plurality of outlet temperature measurements, and an amount of fuel used to heat the fluid flowing through the heat exchanger; and
    determine, based on evaluating the plurality of inlet temperature measurements and the plurality of outlet temperature measurements, the amount of the fuel.

2. The heating system of claim 1, wherein the plurality of inlet temperature measurements and the plurality of outlet temperature measurements are received by the controller over time.

3. The heating system of claim 1, wherein the managed fluid system comprises a swimming pool.

4. The heating system of claim 1, wherein the controller is further configured to:
- evaluate the at least one operating component over time; and
- recommend replacement of the at least one operating component when a performance level of the at least one operating component falls below a threshold value.

5. The heating system of claim 1, wherein the heat exchanger comprises a thermostatic valve.

6. The heating system of claim 5, wherein the thermostatic valve controls a flow rate of the fluid leaving the heat exchanger to an outlet port.

7. The heating system of claim 6, wherein the thermostatic valve is adjusted based on the outlet temperature of the fluid as measured by the second temperature sensor.

8. The heating system of claim 1, wherein the fuel comprises natural gas.

9. The heating system of claim 1, wherein the fuel comprises propane.

10. The heating system of claim 1, wherein the fluid is water.

11. The heating system of claim 1, wherein the controller is further configured to:
- update the at least one lookup table over time by comparing previous forecast data with corresponding actual data.

12. The heating system of claim 1, wherein the at least one lookup table is organized by multiple families of heat exchangers.

13. The heating system of claim 12, wherein the at least one lookup table is further organized by multiple operating modes within each family of the multiple families of heat exchangers.

14. The heating system of claim 1, wherein the at least one lookup table and the at least one algorithm are stored in a storage repository in communication with the controller.

15. The heating system of claim 1, wherein the first temperature sensor device measures the inlet temperature continuously while the fluid flows through an inlet port.

16. The heating system of claim 1, wherein the fluid flows through the heat exchanger using a circulation system that is remote from the heat exchanger.

17. The heating system of claim 16, wherein the circulation system operates independently of the controller.

18. A controller for a heating system of a managed fluid system, the controller comprising:
- a control engine that is configured to:
  - receive a plurality of inlet temperature measurements made by a first temperature sensor device, wherein the first temperature sensor device is configured to measure the plurality of inlet temperatures of a fluid flowing into a heat exchanger of the heating system;
  - receive a plurality of outlet temperature measurements made by a second temperature sensor device, wherein the second temperature sensor device is configured to measure the plurality of outlet temperatures of the fluid flowing out of the heat exchanger of the heating system;
  - evaluate the plurality of inlet temperature measurements and the plurality of outlet temperature measurements using at least one lookup table and at least one algorithm wherein the at least one lookup table comprises a correlation between the plurality of inlet temperature measurements, the plurality of outlet temperature measurements, and an amount of fuel used to heat the fluid flowing through the heat exchanger; and
  - determine, based on evaluating the plurality of inlet temperature measurements and the plurality of outlet temperature measurements, the amount of the fuel.

19. A non-transitory computer-readable medium comprising instructions that, when executed by a hardware processor, perform a method for managing a heating system of a managed fluid system, the method comprising:
- receiving a plurality of inlet temperature measurements made by a first temperature sensor device, wherein the first temperature sensor device is configured to measure the plurality of inlet temperatures of a fluid flowing into a heat exchanger of the heating system;
- receiving a plurality of outlet temperature measurements made by a second temperature sensor device, wherein the second temperature sensor device is configured to measure the plurality of outlet temperatures of the fluid flowing out of the heat exchanger of the heating system;
- evaluating the plurality of inlet temperature measurements and the plurality of outlet temperature measurements using at least one lookup table and at least one algorithm, wherein the at least one lookup table comprises a correlation between the plurality of inlet temperature measurements, the plurality of outlet temperature measurements, and an amount of fuel used to heat the fluid flowing through the heat exchanger; and
- determining, based on evaluating the plurality of inlet temperature measurements and the plurality of outlet temperature measurements, the amount of the fuel.

20. The non-transitory computer-readable medium of claim 19, further comprising:
- adjusting the at least one algorithm based on actual data compared to previously-calculated values.

* * * * *